(12) United States Patent
Noh et al.

(10) Patent No.: US 11,051,344 B2
(45) Date of Patent: *Jun. 29, 2021

(54) METHOD FOR TRANSMITTING AND RECEIVING RANDOM ACCESS REQUEST AND TRANSMITTING AND RECEIVING RANDOM ACCESS RESPONSE

(71) Applicant: Pantech Corporation, Seoul (KR)

(72) Inventors: Min Seok Noh, Gyeonggi-do (KR); Yeong Hyeon Kwon, Gyeonggi-do (KR); Jin Sam Kwak, Gyeonggi-do (KR); Dong Cheol Kim, Gyeonggi-do (KR); Sung Ho Moon, Gyeonggi-do (KR); Seung Hee Han, Gyeonggi-do (KR); Hyun Woo Lee, Gyeonggi-do (KR); Dragan Vujcic, Limours (FR)

(73) Assignee: PANTECH CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,269

(22) Filed: Dec. 11, 2019

(65) Prior Publication Data

US 2020/0120717 A1 Apr. 16, 2020

Related U.S. Application Data

(63) Continuation of application No. 16/039,526, filed on Jul. 19, 2018, now abandoned, which is a
(Continued)

(30) Foreign Application Priority Data

May 22, 2008 (KR) ........................ 10-2008-0047656

(51) Int. Cl.
*H04W 56/00* (2009.01)
*H04W 74/08* (2009.01)
(Continued)

(52) U.S. Cl.
CPC ....... *H04W 74/0833* (2013.01); *H04L 1/1887* (2013.01); *H04W 72/0413* (2013.01);
(Continued)

(58) Field of Classification Search
CPC ......... H04W 74/0833; H04W 72/0413; H04W 72/0446; H04W 74/006; H04W 74/08; H04W 72/12; H04L 1/1887
(Continued)

(56) References Cited

U.S. PATENT DOCUMENTS 6,014,562 A 1/2000 Weiss
7,301,921 B2 11/2007 Heo
(Continued)

FOREIGN PATENT DOCUMENTS

CN 1516349 7/2004
CN 1949681 4/2007
(Continued)

OTHER PUBLICATIONS

Office Action issued by the State Intellectual Property Office dated Dec. 20, 2016.
(Continued)

*Primary Examiner* — Sai Ming Chan
(74) *Attorney, Agent, or Firm* — Capitol IP Law Group, PLLC

(57) ABSTRACT

A base station transmits a random access response in response to a random access request (random access preamble) of a user equipment. The random access response includes information about a time when the random access request is transmitted and sequence number information of the random access request (random access preamble). The user equipment checks whether the received random access response is the response of the random access request transmitted by the user equipment, using the information
(Continued)

about the time when the random access request is transmitted and the sequence number information included in the received random access response.

16 Claims, 17 Drawing Sheets

Related U.S. Application Data continuation of application No. 15/690,042, filed on Aug. 29, 2017, now Pat. No. 10,057,925, which is a continuation of application No. 15/069,340, filed on Mar. 14, 2016, now Pat. No. 9,750,054, which is a continuation of application No. 13/960,448, filed on Aug. 6, 2013, now Pat. No. 9,288,824, which is a continuation of application No. 13/340,447, filed on Dec. 29, 2011, now Pat. No. 8,611,297, which is a continuation of application No. 12/347,352, filed on Dec. 31, 2008, now Pat. No. 8,102,804.

(60) Provisional application No. 61/018,492, filed on Jan. 1, 2008.

(51) Int. Cl.
*H04W 74/00* (2009.01)
*H04L 1/18* (2006.01)
*H04W 72/04* (2009.01)
*H04W 72/12* (2009.01)

(52) U.S. Cl.
CPC ..... *H04W 72/0446* (2013.01); *H04W 74/006* (2013.01); *H04W 74/08* (2013.01); *H04W 72/12* (2013.01)

(58) Field of Classification Search
USPC .......................................................... 370/336
See application file for complete search history.

(56) References Cited

U.S. PATENT DOCUMENTS

| | | | |
|---|---|---|---|
| 8,000,294 B2 | 8/2011 | Uemura et al. | |
| 8,054,791 B2 | 11/2011 | Vujcic | |
| 8,102,804 B2 | 1/2012 | Noh et al. | |
| 8,213,370 B2 | 7/2012 | Fischer | |
| 8,218,500 B2 | 7/2012 | Kangude et al. | |
| 2007/0206531 A1 | 9/2007 | Pajukoski et al. | |
| 2007/0291696 A1 | 12/2007 | Zhang et al. | |
| 2008/0139214 A1 | 6/2008 | Sun et al. | |
| 2008/0232317 A1 | 9/2008 | Jen | |
| 2008/0273610 A1* | 11/2008 | Malladi | H04W 74/0833 375/260 |
| 2008/0316961 A1 | 12/2008 | Bertrand et al. | |
| 2010/0093386 A1 | 4/2010 | Damnjanovic et al. | |
| 2010/0172299 A1 | 7/2010 | Fischer et al. | |
| 2010/0195522 A1 | 8/2010 | Lee et al. | |
| 2010/0195640 A1 | 8/2010 | Park et al. | |
| 2010/0309877 A1 | 12/2010 | Damnjanovic et al. | |
| 2010/0323736 A1 | 12/2010 | Fischer | |

FOREIGN PATENT DOCUMENTS

| | | |
|---|---|---|
| CN | 101529831 | 9/2009 |
| KR | 10-2007-0065101 | 6/2007 |
| KR | 10-2007-0080552 | 8/2007 |
| WO | 9960812 | 11/1999 |
| WO | 00/36761 | 6/2000 |
| WO | 2007078165 | 7/2007 |
| WO | 2007083230 | 7/2007 |
| WO | 2007/091831 | 8/2007 |
| WO | 2007091831 | 8/2007 |
| WO | 2008/024788 | 2/2008 |

OTHER PUBLICATIONS

3GPP TS 36.213, V8.1.0, 3rd Generation Partnership Project; Technical Specification Group Physical Radio Access Network; Evolved Universal Terrestrial Radio Access (E-UTRA); Physical layer procedures (Release 8), Nov. 2007.
R2-071938 Clarification on RA procedure, LG Electronics Inc., 3GPP TSG RAN WG2 #58, May 2007, Kobe, Japan.
Supplementary European Search Report issued from the European Patent Office dated Jan. 8, 2013.
Ericsson, E-UTRA Random Access, 3rd Generation Partnership Project, Technical Specification Group Radio Access Network, Working Group 1, Nov. 7, 2005, pp. 1-4.
Ghosh, A., et al., Random Access Design for UMTS Air-Interface Evolution, IEEE 65th Vehicular Technology Conference, 2007, pp. 1 041-1 045, IEEE.
Kishiyama, Y., et al., Investigations on Random Access Channel Structure in Evolved UTRA Uplink, 3rd International Symposium on Wireless Communication Systems, 2006, IEEE.
3GPP TS 36.211, V8.1.0, 3rd Generation Partnership Project; Technical Specification Group Radio Access Network; Evolved Universal Terrestrial Radio Access (E-UTRA); Physical Channels and Modulation (Release 8), Nov. 2007.
3GPP TS 36.321, V8.0.0, 3rd Generation Partnership Project; Technical Specification Group Radio Access Network; Evolved Universal Terrestrial Radio Access (E-UTRA); Medium Access Control (MAC) protocol specification (Release 8), Dec. 2007.
Notice of Preliminary Rejection issued from the State Intellectual Property Office of China dated Aug. 24, 2012.
Non-Final Office Action dated Oct. 17, 2016, in U.S. Appl. No. 15/069,340.
Notice of Allowance dated Apr. 7, 2017, in U.S. Appl. No. 15/069,340.
SIPO, Office Action of CN 201410265062.5 dated Jan. 11, 2018.
Supplementary European Search Report issued from the European Patent Office dated Dec. 12, 2012.

* cited by examiner

< Example of random access response >

< Example of random access response >

<Frame structure type 1>

< Random access preamble format >

< Example of response including time information >

< Example of response including time information >

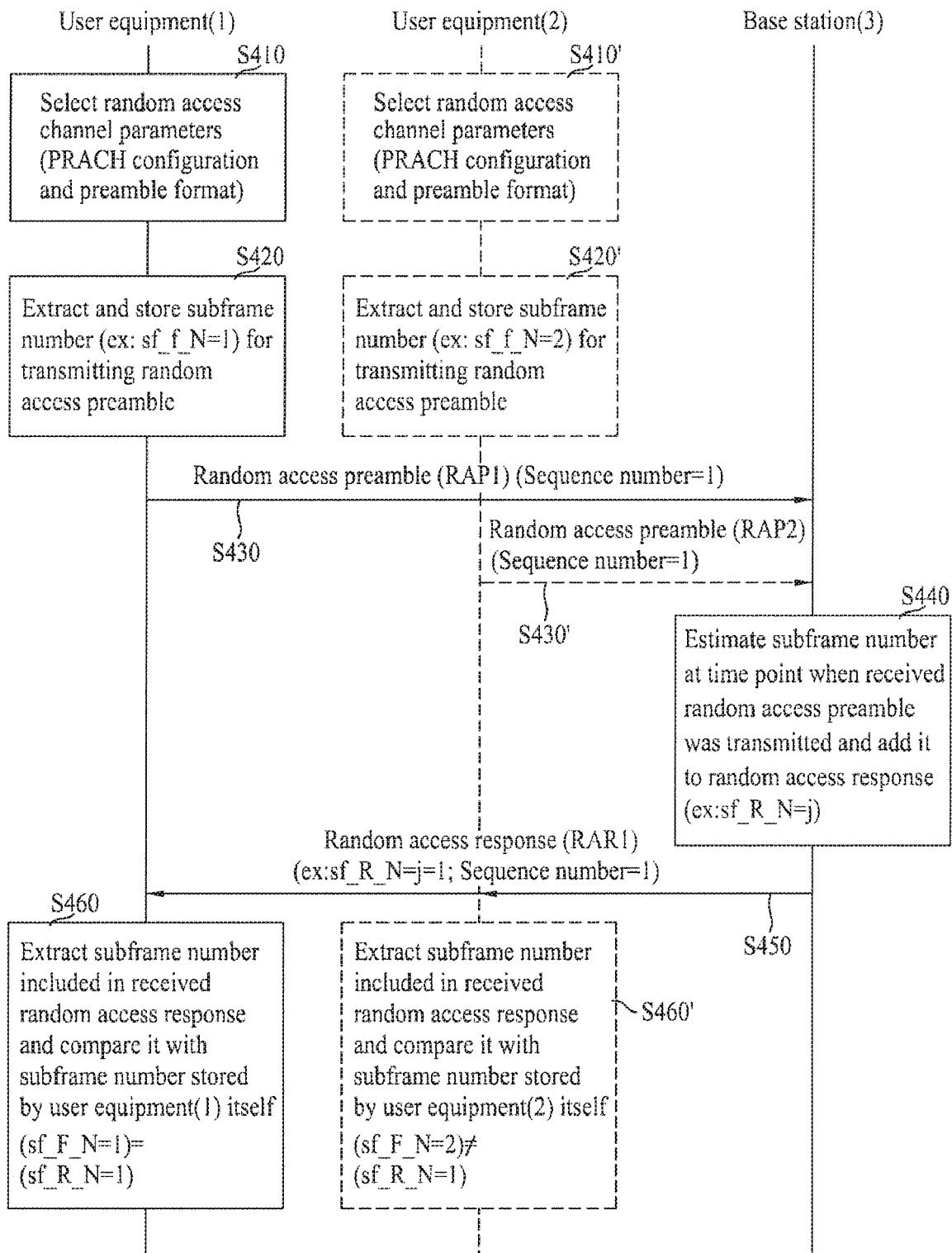

< Example of response including time information if RACH slot has period of 2 ms >

< Example of response including time information if RACH slot has period of 2 ms >

< Example of delayed response if RACH slot has period of 2 ms >

< Example of delayed response if RACH slot has period of 2 ms >

< Renumbering and grouping (or modulo operation) >

< Renumbering and grouping (or modulo operation) >

< Principle of ARQ >

<Principle of HARQ>

< Classification of channel according to layers >

< Classification of channel according to layers and areas >

METHOD FOR TRANSMITTING AND RECEIVING RANDOM ACCESS REQUEST AND TRANSMITTING AND RECEIVING RANDOM ACCESS RESPONSE

CROSS-REFERENCE TO RELATED APPLICATIONS

This application is a continuation of U.S. patent application Ser. No. 16/039,526 filed on Jul. 19, 2018, which is a continuation of U.S. patent application Ser. No. 15/690,042 filed on Aug. 29, 2017, now a U.S. Pat. No. 10,057,925, which is a continuation of U.S. patent application Ser. No. 15/069,340 filed on Mar. 14, 2016, now a U.S. Pat. No. 9,750,054, which is a continuation of U.S. patent application Ser. No. 13/960,448 filed on Aug. 6, 2013, now a U.S. Pat. No. 9,288,824, which is a continuation of U.S. patent application Ser. No. 13/340,447 filed on Dec. 29, 2011, now a U.S. Pat. No. 8,611,297, which is a continuation of U.S. patent application Ser. No. 12/347,352, filed on Dec. 31, 2008, now a U.S. Pat. No. 8,102,804, which claims priority of Korean patent application number 10-2008-0047656, filed on May 22, 2008 and U.S. Provisional Application No. 61/018,492, filed on Jan. 1, 2008. The disclosure of each of the foregoing applications is incorporated herein by reference in its entirety.

BACKGROUND OF THE INVENTION

Field of the Invention

The present invention relates to a wideband radio access system, and more particularly, to a method of transmitting and receiving a random access request (random access preamble) and transmitting and receiving a random access response in a wideband radio access system.

Discussion of the Related Art

In a technology related to a wideband radio access system, each user equipment may attempt to access the system with a randomly selected sequence or opportunity in each random access channel (RACH) slot. A base station detects a random access sequence (or an RACH sequence) and then transmits a random access response (or an RACH response). Each user equipment receives the random access response from the base station, considers a response including its sequence as its response, and performs a timing advance operation.

In the technology of this field, each user equipment may attempt to access the system with a randomly selected sequence or opportunity in each RACH slot. A base station detects the RACE sequence and then transmits a response thereof. Each user equipment receives the RACH response from the base station, considers a response including, its sequence as its response and performs a timing advance operation. At this time, if an accurate time interval is not present when each user equipment waits for the response, each user equipment may erroneously receive a response of another user equipment as its response. This state is shown in FIG. 1A. FIG. 1A is a view showing an example of an RACH response (random access response). This state may appear in all RACH periods. Referring to "3GPP TS 36.211 v.8.1.0, 'Evolved Universal Terrestrial Radio Access (E-UTRA); Physical channels and modulation', 2007 Dec. 20" regarding to random access in a wideband radio access system, a table for a random access preamble format, a random access preamble parameter and random access preamble timing for preamble formats 0 to 3 is described. FIG. 1A shows an RACH slot having a period of 1 ms and a preamble format of 0.

In FIG. 1A, a first user equipment 1 attempts access with a randomly selected sequence 1 in an uplink (UL) subframe 0 (S110). In an uplink subframe 1, a second user equipment 2 attempts access with a randomly selected sequence 1 (S120). If a base station detects the sequences of the two user equipments, the base station transmits responses of the detected sequences (S130). At this time, the two user equipments 1 and 2 which attempt access wait for their responses. When the response of the sequence 1 is reached in an uplink subframe 7, both the user equipment 1 (UE1) and the user equipment 2 (UE2) may determine that the response reached in the uplink subframe 7 is the response for their sequence. In this case, one of the two user equipments erroneously determines that the response reached in the uplink subframe 7 is its response. Since the two user equipments perform time synchronization by the response received in the uplink subframe 7, one user equipment performs erroneous time synchronization. In addition, since data or a control signal is transmitted again in uplink using the same resource indicated by the response, a problem that the two user equipments use the same resource occurs.

In FIG. 1 and the description related to FIG. 1, a cell radius is not considered in order to facilitate the understanding of the problems of the technology related to the present invention. However, if the cell radius is actually about 50 km and the propagation speed of an electromagnetic wave is considered, a random access preamble transmitted by the user equipment 1 in the uplink subframe 0 may reach the base station in a downlink subframe 0 or a downlink subframe 1, and a random access preamble transmitted by the user equipment 2 in the uplink subframe 1 may reach the base station in a downlink subframe 1 or a downlink subframe 2. In addition, a random access response transmitted, by the base station in the downlink subframe 1 may reach the user equipment 1 and/or the user equipment 2 in the uplink subframe 1 or an uplink subframe 2 and a random access response transmitted by the base station in the downlink subframe 2 may reach the user equipment 1 and/or the user equipment 2 in the uplink subframe 2 or an uplink subframe 3 (see FIG. 1B).

Unlike the above example, if a resource available in a time domain in which the base station transmits the response is not present, a problem that the response cannot be transmitted on time occurs. In this case, the response of the RACH slot is not transmitted or is delayed. At this time there is a need for a method of distinguishing between a delayed response and a response which is transmitted on time or between delayed responses.

In addition, if responses of several RACH slots are collected and are simultaneously transmitted, there is a need for a method of distinguishing between RACH slots.

SUMMARY OF THE INVENTION

An object of the present invention devised to solve the problem lies on a method of transmitting and receiving a random access response, which is capable of preventing a user equipment which attempts to access using, a randomly selected sequence from erroneously receiving a response for the access of another user equipment, which attempts access with the same sequence, as a response for its access.

The object of the present invention can be achieved by providing a method of transmitting a random access preamble and receiving a random access response, the method including: at an user equipment, transmitting the tandem access preamble; and at the user equipment, receiving the random access response of the random access preamble, wherein the random access response received by the user equipment includes time related information of a time point when the random access preamble corresponding to the received random access response is transmitted. The time related information may include a subframe related number at the time point when the user equipment transmits the random access preamble. The subframe related number may be a number allocated to a subframe, in which a random access channel (RACH) slot is present, of subframes. The allocation may be performed by a modulo operation of the subframe number, in which the RACH slot is present, of the subframes. The modulo operation may be a modulo-4 operation. The time related information may be estimated on the basis of a cell size.

In another aspect of the present invention, provided herein is a method of receiving a random access preamble and transmitting a random access response, the method including: at a base station, receiving the random access preamble; and at the base station, transmitting the random access response of the received random access preamble, wherein the transmitted random access response includes time related information of a time point when the received random access preamble is transmitted or delay offset information related to a processing delay time consumed for transmitting the random access response from when the base station receives the random access preamble. The transmitted time point may be estimated by the base station on the basis of a cell size. The received random access preamble may include time related information of the time point when the received random access preamble is transmitted, and the time related information included in the transmitted random access response may be associated with time related information included in the received random access request.

In another aspect of the present invention, provided herein is method of transmitting a random access preamble and receiving a random access response, the method including: at a user equipment, transmitting the random access preamble; and at the user equipment, receiving the random access response, wherein the receiving of the random access response at the user equipment is performed in a predetermined time period including a predetermined time after a time point when the random access preamble is transmitted, and the predetermined time is a time when a time obtained by adding a predetermined offset time to a time corresponding to a half of a hybrid automatic repeat request (HARQ) process round trip time elapses after the time point when the random access preamble is transmitted. The random access response may include delay offset information, and the delay offset information may be used to change the predetermined time period.

According to the present invention, it is possible to solve a problem that a user equipment recognizes a random access response for a random access request transmitted by another user equipment as a response for its random access request.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 4 is a flowchart illustrating a method of transmitting and receiving a random access request and a random access response according to another embodiment of the present invention.

DETAILED DESCRIPTION OF THE INVENTION

Reference will now be made in detail to the preferred embodiments of the present invent in, examples of which are illustrated in the accompanying drawings. The following embodiments are examples applied to a wideband radio access system, which may refer to "3GPP TS 36.211 v.8.1.0, 'Evolved Universal Terrestrial Radio Access (E-UTRA); Physical channels and modulation', 2007 Dec. 20" regarding to random access in a wideband radio access system.

In the wideband radio access system, a "channel" refers to a passage allocated to transmitter and receiver and indicates a logical signal passage rather than a physical transmission path. Accordingly, several channels may exist in one transmission path.

Figure 15:
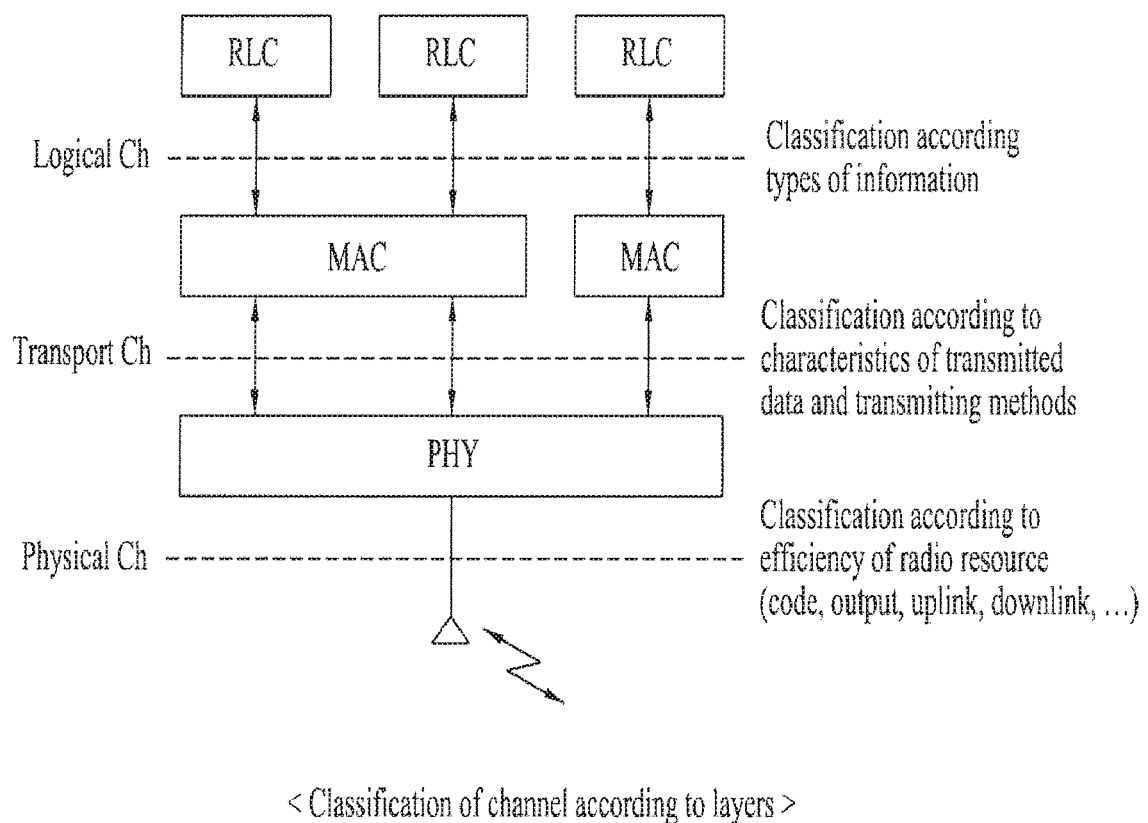
FIG. 15 is a view explaining the classification of channels according to layers in a wideband radio access system.
Figure 16:
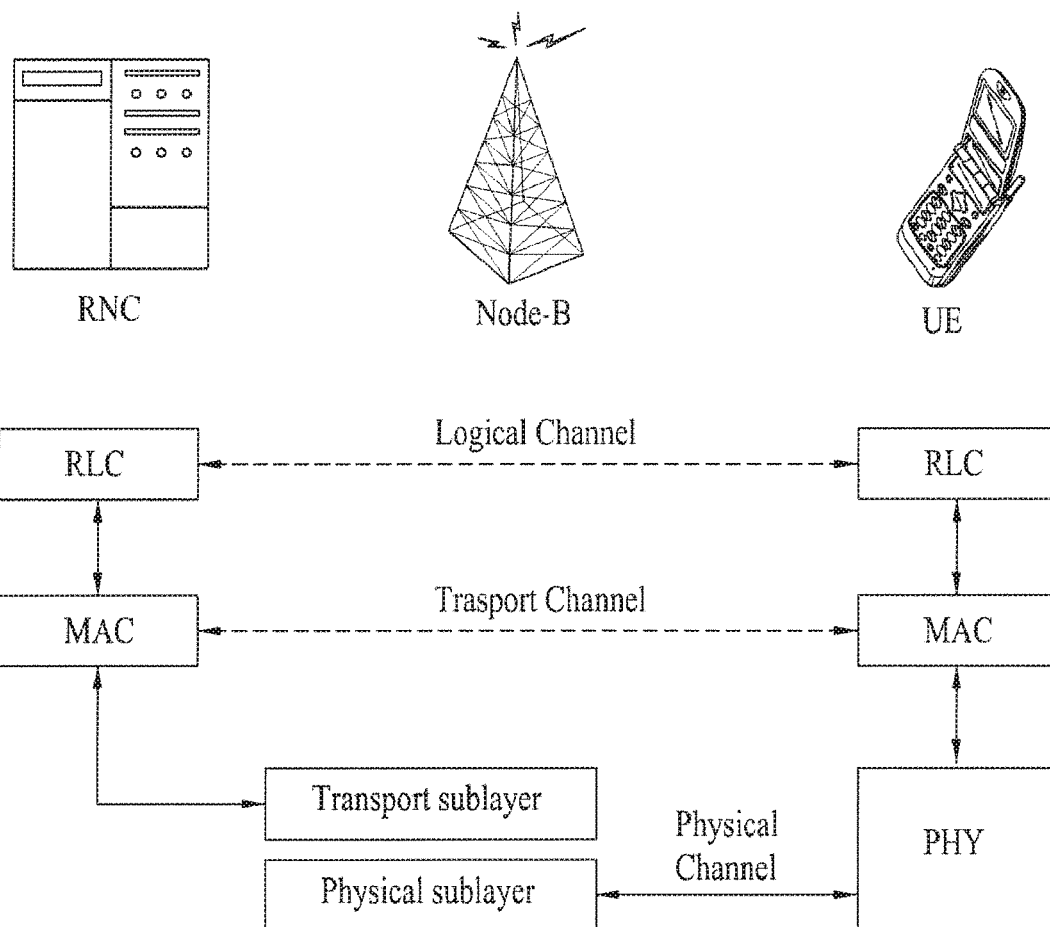
FIG. 16 is a view explaining the classification of channels according to layers and areas.

In an asynchronous wideband code division multiplexing access (WCDMA), three channels are defined according to layers. A first channel is a logical channel between a radio link control (RLC) layer and a medium access control (MAC) layer, and is classified depending on which type of information is included, that is, the "type of information". A second transport channel is a channel between the MAC layer and a physical layer, is classified according to the "characteristics of delivery information", and is largely classified into a dedicated transport channel and a common transport channel. A third physical channel is a channel transmitted via an actual antenna and is classified according to the "radio resource and, more particularly, efficiency of a code and RI output" (see FIGS. 15 and 16). In the RLC layer for providing transport reliability, retransmission is performed in the unit of logical channels. That is, when an error occurs in a receiver side, logical channel retransmission is performed in the information units (transmission time intervals (TTIs)), instead of the frame units configured in the physical layer.

The transport channel is the delivery channel between the physical layer and an upper layer and is defined according to the characteristics of transport data and transmitting methods. The transport channel transmits data received from the logical channel, but the logical channel and the transport channel do not one-to-one correspond to each other. Several logical channels may be transmitted using one transport channel. Accordingly, the MAC layer between the logical channel and the transport channel perform mapping between the logical channel and the transport channel.

Similar to the logical channel, the transport channel is considered as the flow of data rather than the physical channel. In particular, since all protocols are located at the same location in the user equipment, the transport channel of the user equipment is internally defined between the MAC layer and the physical layer. Since the physical layer is located at a node B in a universal mobile telecommunication system (UMTS) terrestrial radio access network (UTRAN), an appropriate interface should be defined for data exchange with the MAC layer located at a radio network controller (RNC).

The transport channel is classified into the dedicated transport channel and the common transport channel according to the characteristics of the delivery information. A dedicated channel (DCH) belongs to the dedicated transport channel, and a broadcasting channel (BCH) a forward access channel (FACH), a paging channel (PCH) a random access channel (RACH), a downlink shared channel (DSCH), a common packet channel (CPCH), and a high speed-downlink shared channel (HS-DSCH) belong to the common transport channel.

The RACH transmits control information such as short packet data such as a short messaging service (SMS) and call set-up in uplink, and operates by a process similar to a synchronous random access channel on the basis of a slotted. ALOHA random access scheme. Accordingly, collision risk with the signal of another user equipment may occur, and an open-loop power control is used. While a transmission, rate of 9.6 kbps is defined in the synchronous CDMA system, a transmission rate of up to 120 kbps is defined in an asynchronous system. However, the transmission rate is actually restricted to about 15 kbps.

The physical channel is transmitted via the actual antenna and various types of information are transmitted is one physical channel or several physical channels. Since same overhead physical channels are used for aiding the transmission and reception of the physical channels regardless of the upper layer, they are generated by a base station without a direct mapping relation with the transport channel. Among the transport channels, the RACH is mapped to a physical random access channel (PRACH) of the physical channel.

In uplink random access, a user equipment which does not access a base station uses a slotted ALOHA random access scheme in order to access the base station, and gradually increases and repeatedly transmits a probe output until access becomes successful when a probe (an action for checking and finding something) transmission fails. In the WCDMA system, an Acquisition Indication sense multiple access (AiSMA) scheme of transmitting only a preamble part in each probe, receiving information that synchronization acquisition of an access preamble is performed from the base station via an acquisition indicated on channel (AICH) and transmitting a message part is employed. Accordingly, since the transmission time of the random access probe in the WCDMA system is extremely shorter than that of the synchronous system, a base station reception noise phenomenon due to the probes which fail in the access to the base station is remarkably improved. Information about subgroups and codes available for a random access preamble part is specified according to access service rating via a system information block (SIB) 5 message from a radio resource management layer which is an upper layer, and information about a transmission format of a message part and a system frame number is received from the MAC layer. A random access channel is used to perform an operation related to a request for the set-up of the call to the base station and to transmit short one-way packet data of one or two frames in uplink.

The message part transmitted after an ACK signal fir a preamble signal is received has a length of 10 msec or 20 msec, and a substantial data part and a control part are multiplexed to an I/Q channel, are BPSK-modulated and are simultaneously transmitted.

In order to minimize a probability that RACH signals of several user equipments collide, the transmission of the RACH signals is started in respective access slots specified to the user equipments. The access slot number is uniquely specified in an ripper layer. Parameters related to the RACH are broadcasted to all the reception-standby user equipments via the SIB 5 of the BCH.

Figure 1A:
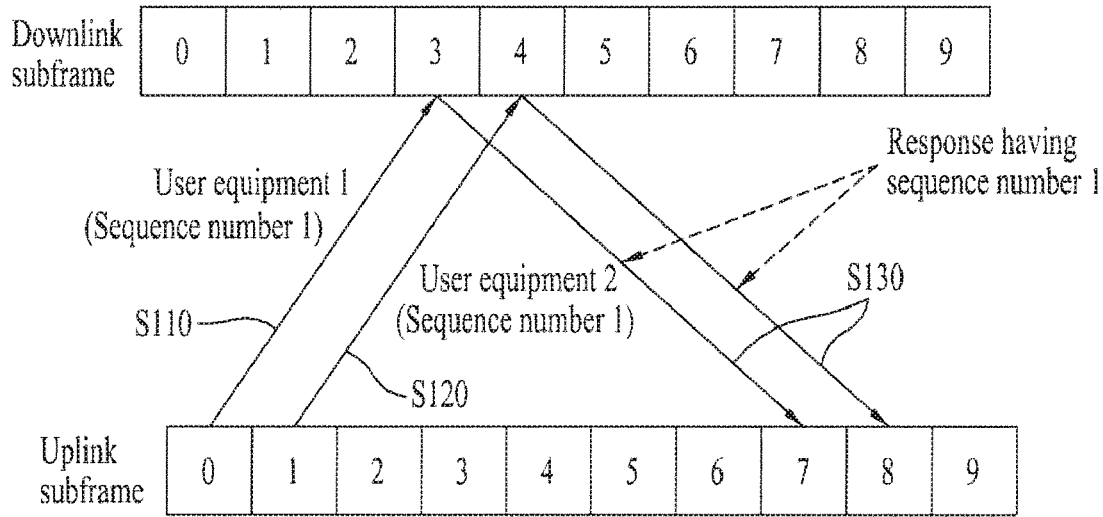
FIGS. 1A and 1B are views showing an example of a random access response.
Figure 1B:
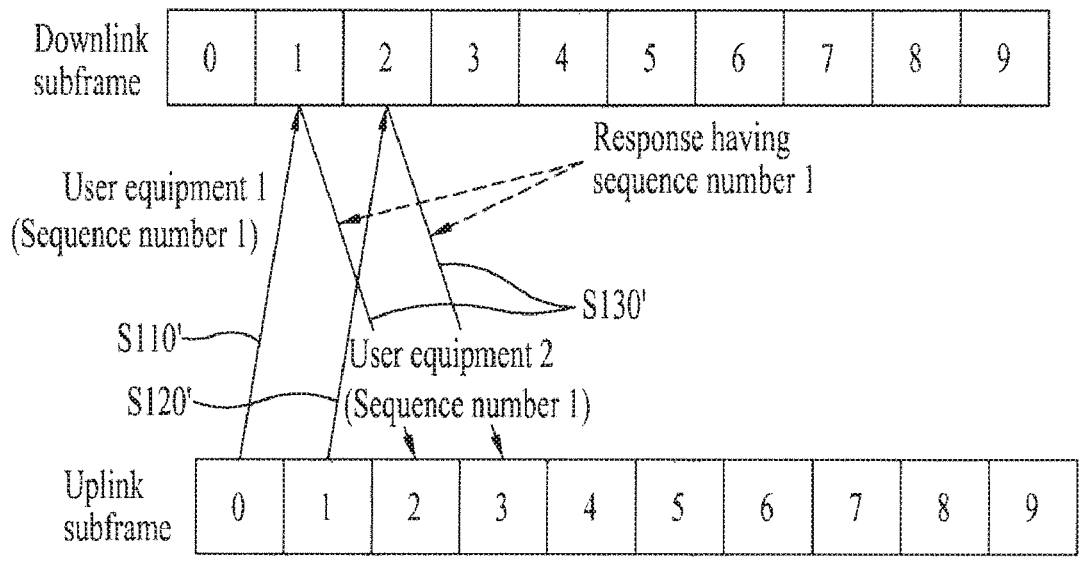
Figure 2A:
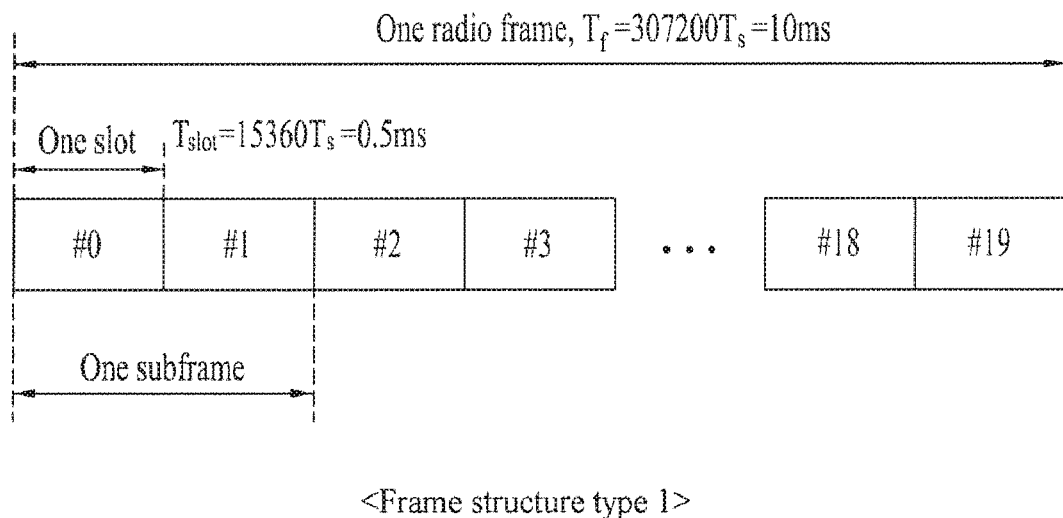
FIG. 2A is a view showing an example of a frame structure used in a wideband radio access system.

FIG. 2A is a view showing an example of a frame structure used in a wideband radio access system.

In "3GPP TS 36.211 v.8.1.0, 'Evolved Universal Terrestrial Radio Access (E-UTRA); Physical channels and modulation', 2007 Dec. 20", a physical channel for an evolved UTRA is described. Two frame structures may be used. A first frame structure (see FIG. 2A) is applicable to a full duplex frequency division duplex (FDD) and a half duplex FDD. Each radio frame has a length of 10 ms and is configured by 20 slots each having a length of 0.5 ms. The slots have numbers of 0 to 19. One subframe is configured by two continuous slots. In the FDD, 10 subframes are used for an uplink transmission and a downlink transmission during 10 ms.

Figure 2B:
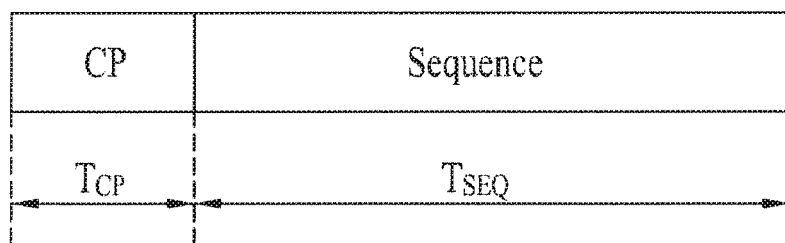
FIG. 2B is a view showing an example of a random access preamble format.

FIG. 2B is a view showing an example of a random access preamble format.

As shown in FIG. 2B, a physical layer random access preamble includes a cyclic prefix (CP) having a length of T.sub.CP and a sequence part having a length of T.sub.SEQ. Parameters are shown in Table 1 and are decided by the frame structure and the random access configuration. The preamble format is controlled by the upper layer.

TABLE 1

| Preamble format | $T_{CP}$ | $T_{SEQ}$ |
| --- | --- | --- |
| 0 | $3618 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 | $448 \cdot T_S$ | $4096 \cdot T_S$ |
| (Corresponding to only frame structure type 2.) | | |

With respect to the preamble formats 0 to 3, a maximum of one random access resource exists per subframe. Table 2 shows subframes for allowing a random access preamble transmission in the given configuration. If it is assumed that a timing advance is zero, the start of the random access preamble will be aligned in parallel to the start of an uplink subframe corresponding to a user equipment (terminal). In Table 2, the random access channel has a period of 1 ms to 20 ms.

TABLE 2

| PRACH System configuration | System frame number | Subframe number |
| --- | --- | --- |
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

In the following description, the RACH configuration having the period of 1 ms will be described. However, the present invention is not limited to such an RACH period. In addition, since the effect of the present invention is further increased when the period is short, the present invention may be used only in a specific RACH configuration having a short period. In addition, although the 3GPP LTE system is used tort convenience of description, the present invention is not limited to this. For example, the present invention is applicable to a ranging channel of the IEEE 802.16 (hereinafter, referred to as 802.16). In other words, an RACH response of the LTE described in the present invention may be analyzed as a ranging response of the 802.16.

Figure 3A:
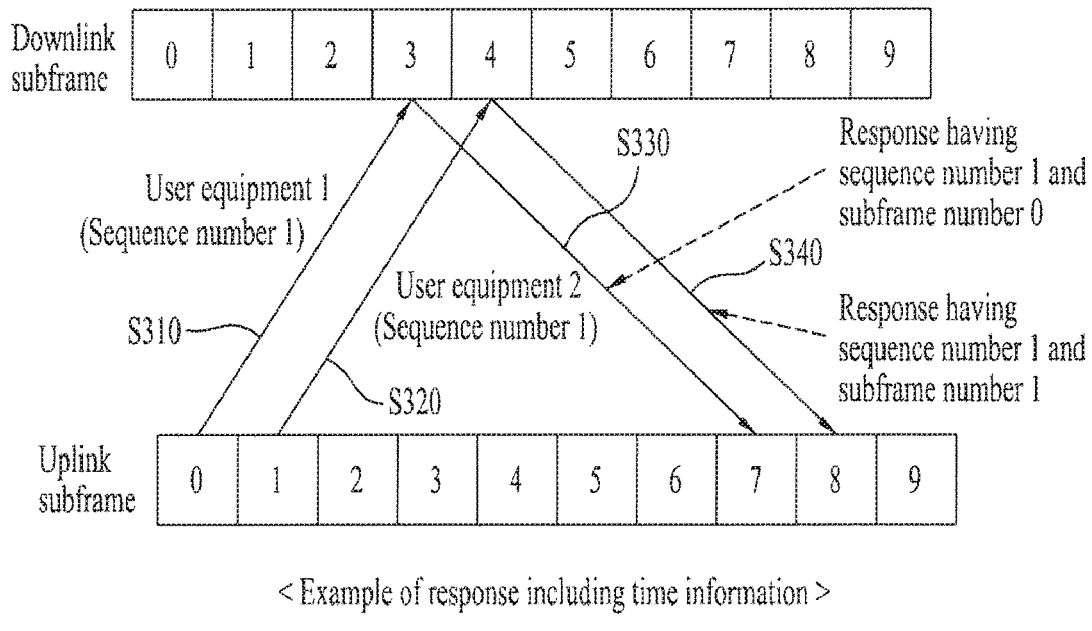
FIGS. 3A and 3B are views showing a random access response including time information according to an embodiment of the present invention.

FIG. 3A is a view showing a random access response including time information according to an embodiment of the present invention.

In the embodiment of the present invention described in FIG. 3A, since a method of transmitting a random access response including time information is used, it is possible to prevent the random access response from being erroneously received. In this case, since additional information is further transmitted, signaling overhead may slightly occur. For example, as shown in FIG. 3A, when the base station transmits the random access response, it is possible to transmit the uplink subframe number of the time point when the user equipment transmits a random access request (random access preamble) (hereinafter, the uplink subframe number of an uplink subframe 0 is denoted by "0"). Like the embodiment described in FIG. 3A, it is assumed that each subframe has a length of 1 ms in a time domain. In addition, it is assumed that an RACH slot for transmitting the random access preamble has a period of 1 ms. A user equipment 1 may transmit a random access preamble having a randomly selected sequence number 1 in an uplink subframe 0 (S310). A user equipment 2 may transmit a random access preamble having a sequence number 1, which is randomly selected but is identical to the sequence transmitted by the user equipment 1, in an uplink subframe 1 (S320). A base station may receive the random access sequence transmitted by the user equipment 1 in a downlink subframe 3 and then transmit a random access response thereof (S330). This random access response may include information about the sequence number 1 and the uplink subframe 0. Thereafter, the base station may receive the random access sequence transmitted by the user equipment 2 in a downlink subframe 4 and then transmit a random access response thereof (S340). This random access response may include information about the sequence number 1 and the uplink subframe 1. The user equipment 1 and the user equipment 2 may receive the random access response of the random access preamble transmitted by the user equipment 1 in an uplink subframe 7. Thereafter, the user equipment 1 and the user equipment 2 may check whether the uplink subframe number included in the received random access response is identical to any one of the uplink subframe numbers of the random access preambles transmitted by the user equipment 1 and the user equipment 2. If the uplink subframe number included in the random access response received by the user equipment 1 is identical to the uplink subframe number of the random access preamble transmitted by the user equipment 1, it may be determined, that the random access response received by the user equipment 1 is the response of the random access transmitted by the user equipment 1. However, if the uplink subframe number included in the random access response received by the user equipment 1 is not identical to the uplink subframe number of the random access preamble transmitted by the user equipment 1, it may be determined that the random access response received by the user equipment 1 is not the response of the random access transmitted by the user equipment 1. Similarly, if the uplink subframe number included in the random access response received by the user equipment 2 is identical to the uplink subframe number of the random access preamble transmitted by the user equipment 2, it may be determined that the random access response received by the user equipment 2 is the response of the random access transmitted by the user equipment 2. However, if the uplink subframe number included in the random access response received by the user equipment 2 is not identical to the uplink subframe number of the random access preamble transmitted by the user equipment 2, it may be determined that the random access response received by the user equipment 2 is not the response of the random access transmitted by the user equipment 2.

Figure 3B:
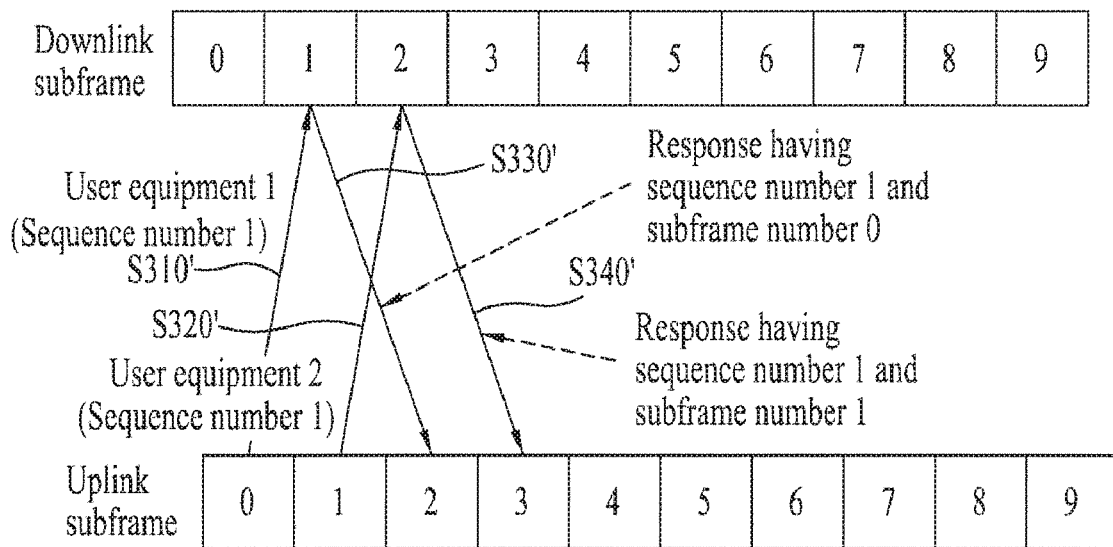

In FIG. 3A and the description related to FIG. 3A, a cell radius is not considered in order to facilitate the understanding of the problems of the technology related to the present invention. However, if the cell radius is actually about 50 km and the propagation speed of an electromagnetic wave is considered, the random access preamble transmitted by the user equipment 1 in the uplink subframe 0 may reach the base station in a downlink subframe 0 or a downlink subframe 1, and the random access preamble transmitted by the user equipment 2 in the uplink subframe 1 may reach the base station in a downlink subframe 1 or a downlink subframe 2. Similarly, a random access response transmitted by the base station in the down link subframe 1 may reach the user equipment 1 and/or the user equipment 2 in the uplink subframe 1 or an uplink subframe 2 and a random access response transmitted by the base station in the downlink subframe 2 may reach the user equipment 1 and/or the user equipment 2 in the uplink subframe 2 or an uplink subframe 3 (see FIG. 3B).

FIG. 4 is a flowchart illustrating a method of transmitting, and receiving, a random access between a user equipment 1, a user equipment 2 and a base station, according to another embodiment of the present invention.

The user equipment 1 and the user equipment 2 select random access channel parameters, such as a PRACH configuration and a preamble format, in steps S410 and S410', respectively. As the PRACH configuration and the preamble format, one of the configurations shown in Table 1 and Table 2 may be selected. The user equipment 1 and the user equipment 2 may decide the sequence number of the random access preamble to be transmitted and apply it to the preamble, respectively. The random access preamble sequence numbers transmitted by the user equipment 1 and the user equipment 2 may be identical or different. In this embodiment, it is assumed that the sequence numbers transmitted by the user equipment 1 and the user equipment 2 are identical to "1". The user equipment 1 and the user equipment extract and store the uplink subframe numbers at time points when the random access preambles are transmitted, in steps S420 and S420', respectively. The time point when the random access preamble is transmitted by the user equipment 1 may be different from the time point when the random access preamble is transmitted by the user equipment 2. Hereinafter, the respective uplink subframe numbers stored by the user equipment 1 and the user equipment 2 are denoted by sf_F_N. In this embodiment, the random access preambles RAP1 and RAP2 transmitted by the user equipment 1 and the user equipment 2 are transmitted at time points corresponding to the uplink subframe numbers sf_F_N=1 and sf_F_N=2, respectively. The user equipment 1 and the user equipment 2 transmit the random access preambles in steps S430 and S430', respectively.

If the base station 3 receives the random access preambles (e.g., RAP1 and RAP2), the base station 3 extracts the sequence numbers of the received, random access preambles and estimates the uplink subframe numbers sf_F_N=j, which might be transmitted by the received random access preambles, in consideration of the cell radius (cell size). The base station 3 includes the estimated information in the random access responses of the received random access preambles (S440). Thereafter, the base station 3 transmits the random access responses (S450). The transmitted random access responses may reach the user equipment 1 and the user equipment 2. In this embodiment, the base station 3 transmits the random access response of the random access preamble transmitted by the user equipment 1 before transmitting the random access response of the random access preamble transmitted by the user equipment 2. The user equipment 1 and the user equipment 2 receive the respective random access responses transmitted in the step S450. The user equipment 1 and the user equipment 2 extract the uplink subframe numbers included in the received random access responses and compare the extracted subframe numbers with the uplink subframe numbers stored in the step S420 (step S420'), in the steps S460 and S460'. In the user equipment 1, since the uplink subframe number sf_R_N=1 included in the received random access response is identical to the stored uplink subframe number sf_F_N=1 of the random access preamble transmitted by the user equipment 1, it may be determined that the received random access response is the response of the random access preamble transmitted by the user equipment 1. In the user equipment 2, since the uplink subframe number sf_RN=1 included in the received random access response is different from the stored uplink subframe number sf_F_N=2 of the random access preamble transmitted by the user equipment 2, it may be determined that the received random access response is not the response of the random access preamble transmitted by the user equipment 2. Each user equipment may further use sequence information included in the received random access response as well as the uplink subframe number included in the received random access response, in order to check whether the random access response received by each user equipment is the response of the random access preamble transmitted by each user equipment. If both the sequence information and the uplink subframe number included in the random access response received by any user equipment are identical to the sequence information included in the random access preamble transmitted by the user equipment and the uplink subframe number at the time point when the user equipment transmits the random access preamble, it may be determined that the received random access response is the response of the random access preamble transmitted by the user equipment.

Figure 5A:
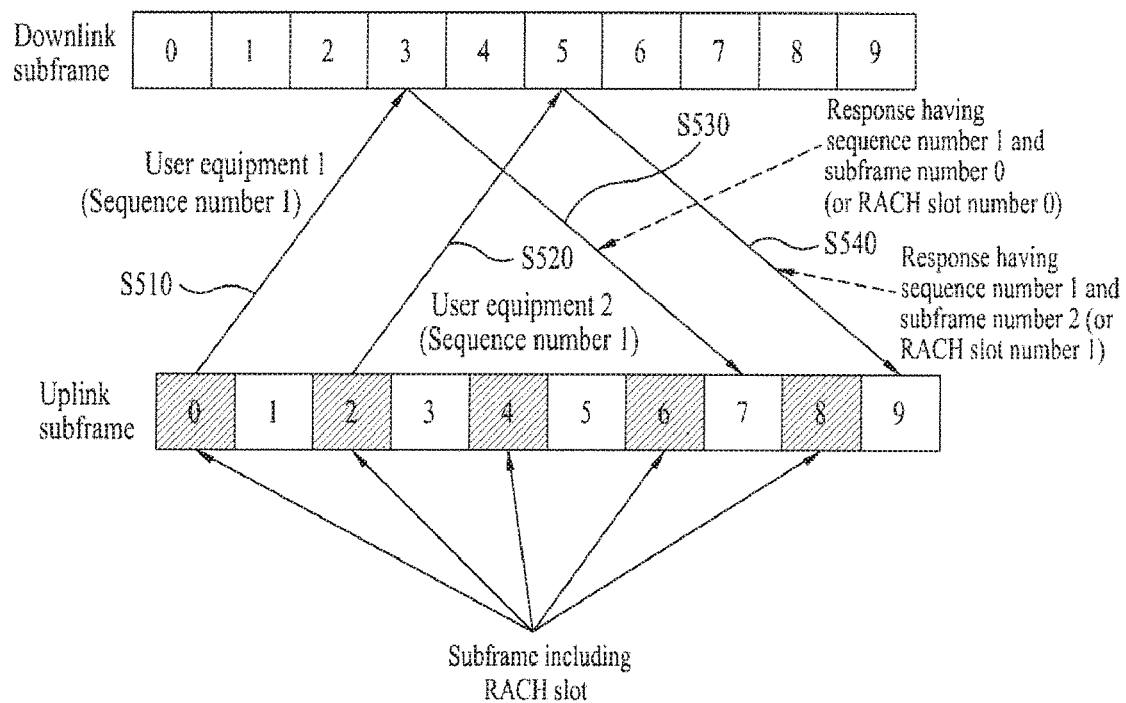
FIGS. 5A and 5B are views showing a random access response including time information if an RACH slot has a period of 2 ms, according to another embodiment of the present invention.

FIG. 5A shows the case where each subframe has a length of 1 ms in a time domain and an RACH slot for transmitting a random access preamble has a period of 2 ins.

A user equipment 1 transmits a random access preamble having a randomly selected sequence number 1 in an uplink subframe 0 (S510). A user equipment 2 transmits a random access preamble having a sequence number 1, which is randomly selected but is identical to the sequence transmitted by the user equipment 1 in an uplink subframe 2 (S520). A base station receives the random access sequence transmitted by the user equipment 1 in a downlink subframe 3 and then transmits a random access response thereof (S530). This random access response (S530) includes the sequence number 1 and the uplink subframe number sf_F_N=0 included in the random access preamble received in the downlink subframe 3, which is estimated by the base station in consideration of a cell radius (cell size). Thereafter, the base station receives the random access sequence transmitted by the user equipment 2 in a downlink subframe 5 and then transmits a random access response thereof (S540). This random access response (S540) may include the sequence number 1 and the uplink subframe number sf_F_N=2 included in the random access preamble received in the downlink subframe 5, which is estimated by the base station in consideration of a cell radius (cell size).

The embodiment of FIG. 5A is different from the embodiment of FIG. 3A in that the random access sequence is transmitted only in the uplink subframe having an even number. That is, the random access sequence is transmitted only in the uplink subframes 0, 2, 4, 6 and 8 which is hatched in FIG. 5A. Accordingly, in order to enable the base station to estimate the up link subframe numbers so as to represent the numbers by binary numbers, four signaling bits are necessary. If the original uplink subframe numbers Original={0, 2, 4, 6, 8} are renumbered to Renumbered={0, 1, 2, 3, 4}, the numbers can be represented using only three signaling bits. Thus, it is possible to reduce the number of signaling bits. This concept is applicable to the embodiment of FIG. 4.

Although one RACH channel is present per subframe in the present invention, this is exemplary for convenience of description and the present invention is applicable to the case were several RACH channels are present per subframe. For example, the RACH channel number and the subframe number can be signaled on a frequency within a subframe. Alternatively, the numbers may be two-dimensionally allocated, and signaled in frequency and time domains. An RACH channel may be numbered on a frequency within a subframe and an RACH channel of a next subframe may be then numbered subsequent to that number. In contrast, an RACH channel is first numbered on a subframe and an RACH channel may be then numbered on another frequency domain subsequent to that number.

In the invention, the RACH subframe number may be defined in the unit of frames or superframes.

Figure 5B:
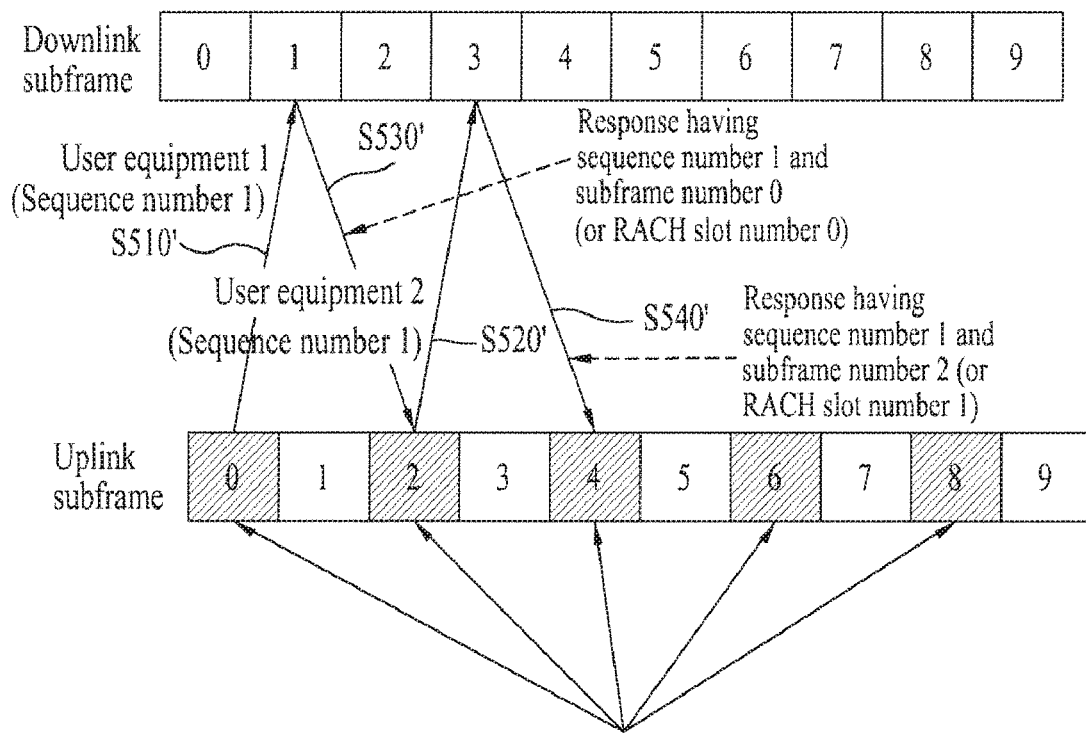

In FIG. 5A and the description related to FIG. 5A, a cell radius is not considered in order to facilitate the understanding of the problems of the technology related to the present invention. However, if the cell radius is actually about 50 km and the propagation speed of an electromagnetic wave is considered, the random access preamble transmitted by the user equipment 1 in the uplink subframe 0 may reach the base station in a downlink subframe 0 or a downlink subframe 1, and the random access preamble transmitted by the user equipment 2 in the uplink subframe 2 may reach the base station in a downlink subframe 2 or a downlink subframe 3. Similarly, a random access response transmitted by the base station in the downlink subframe 1 may reach the user equipment 1 and/or the user equipment 2 in the uplink subframe 1 or an uplink subframe 2, and a random access response transmitted by the base station in the downlink subframe 3 may reach the user equipment 1 and/or the user equipment 2 in the uplink subframe 3 or an uplink subframe 4 (see FIG. 5B).

Figure 6A:
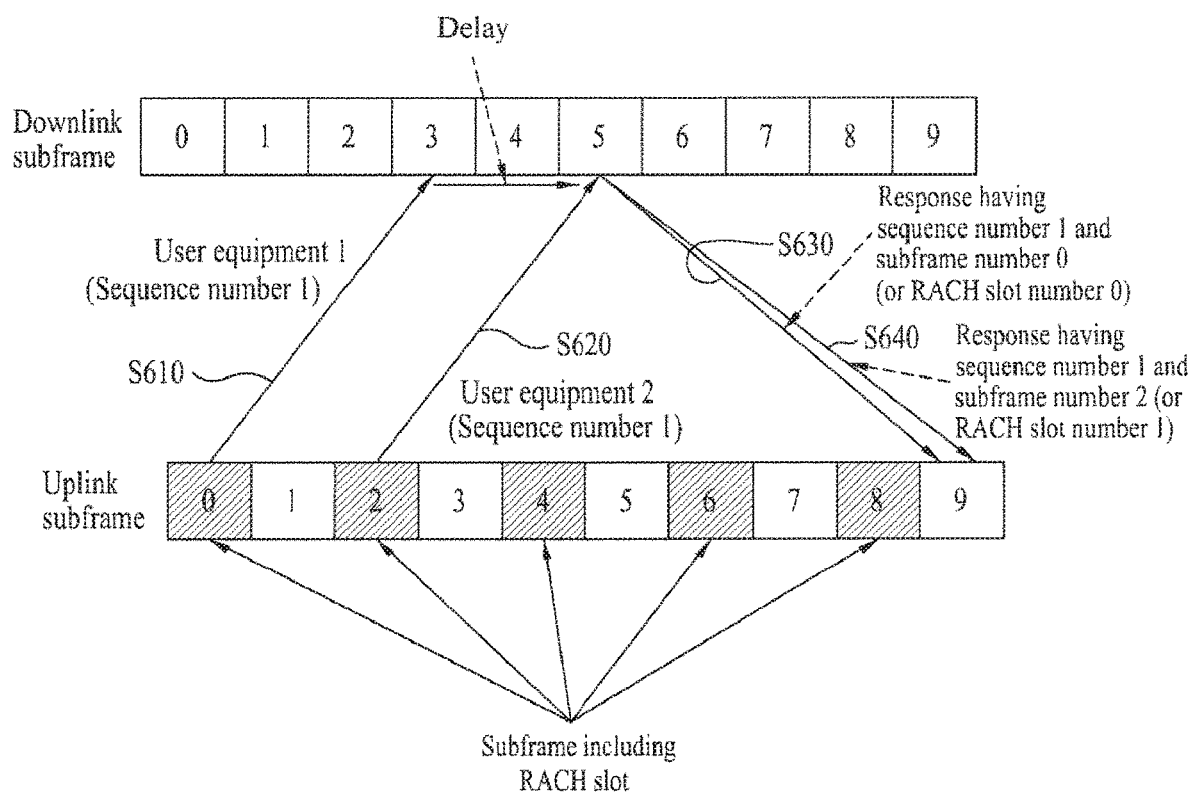
FIGS. 6A and 6B are views showing a delayed random access response if an RACH slot has a period of 2 ms, according to the embodiment of the present invention.

FIG. 6A is a view showing a delayed random access response if an RACH slot has a period of 2 ms, in the embodiment of FIG. 5A.

That is, the random access response of the uplink subframe 0 is delayed. When a base station receives a random access preamble in a downlink subframe 3 (S610), the base station may not have a resource which will be transmitted in downlink. This may occur in various cases. For example, if a resource is used for a dedicated multicast broadcast single frequency network (MBSFN), a unicast downlink resource cannot be allocated. In contrast, although a resource is not used for a special purpose, all resources may be used for other control signals and data signals at a specific time. In this case, the transmission of the random access response may be delayed. In addition, several random access responses may be simultaneously transmitted by one resource. Accordingly, time information (that is, delay offset information) related to the delayed time is preferably included in the random access response. As the time information (or the time related information), other information related to the time and/or the subframe number may be used.

Figure 6B:
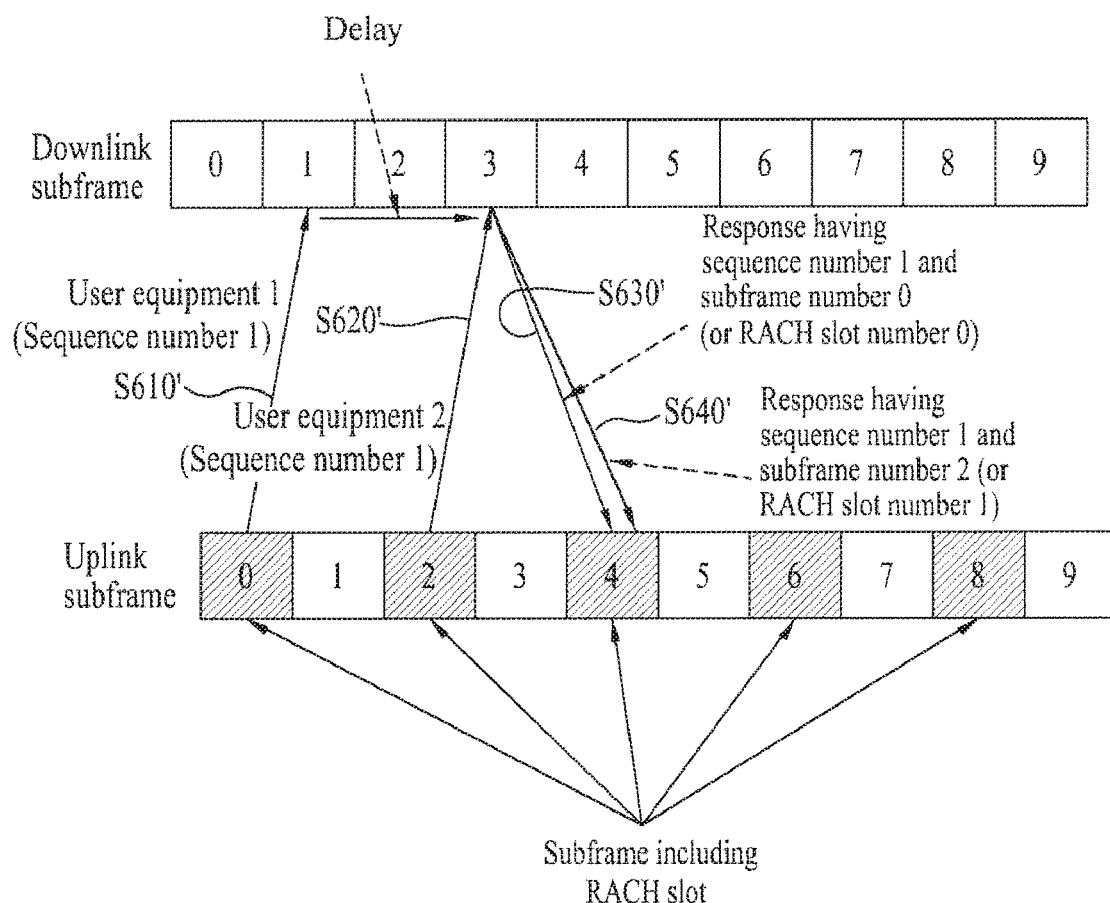

In FIG. 6A and the description related to FIG. 6A, a cell radius is not considered in order to facilitate the understanding of the problems of the technology related to the present invention. However, if the cell radius is actually about 50 km and the propagation speed of an electromagnetic wave is considered, the random access preamble transmitted by the user equipment 1 in the uplink subframe 0 may reach the base station in a downlink subframe 0 or a downlink subframe 1, and the random access preamble transmitted by the user equipment 2 in the uplink subframe 2 may reach the base station in a downlink subframe 2 or a downlink subframe 3. Similarly, a random access response transmitted by the base station in the downlink subframe 3 may reach the user equipment 1 and/or the user equipment 2 in the uplink subframe 3 or an uplink subframe 4 (see FIG. 6B).

Figure 7A:
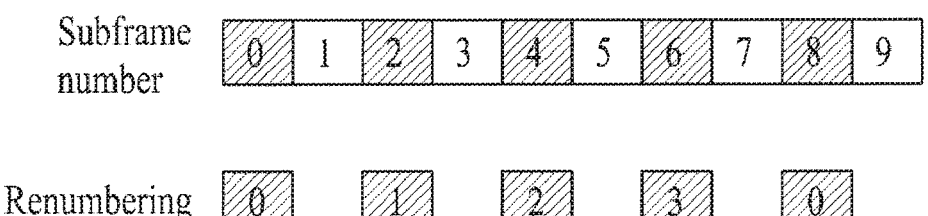
FIGS. 7A and 7B are views explaining renumbering and grouping according to another embodiment of the present invention.
Figure 7B:
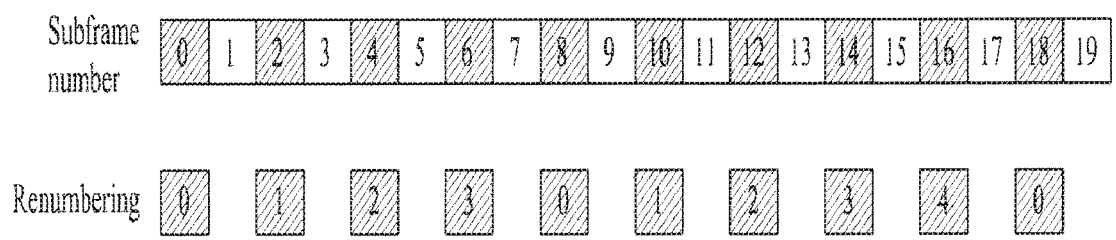

FIGS. 7A and 7B are views explaining, renumbering and grouping according to another embodiment of the present invention.

Up to now the uplink subframe number or the renumbered uplink subframe number was used as the time information included in the random access response. However, a grouping method may be used when the uplink subframe number is renumbered. As the grouping method, a module operation and/or various known methods may be used (the modulo operation indicates an operation for obtaining a remainder when a number is divided by another number). For example, a modulo-4 operation indicates an operation for obtaining a remainder when any number is divided by 4 as a result value. For example, the subframe number may be renumbered so as to be repeated in a period of 10 ms or less. For example, while 4-bit signaling is necessary if a fifteenth PRACH configuration of Table 2 is used, 2-bit signaling is necessary it the uplink subframe number is subjected to the modulo-4 operation. Application examples may be made using various PRACH configurations of Table 2. FIGS. 7A and 7B show one of these examples. In FIGS. 7A and 78B, in a configuration in which the length of an uplink subframe is 1 ins and RACH slots are repeated in a period of 2 ms, the uplink subframe numbers in which the RACH slots are present are renumbered. The uplink subframe numbers are grouped and repeated by the modulo-4 operation.

Figure 8:
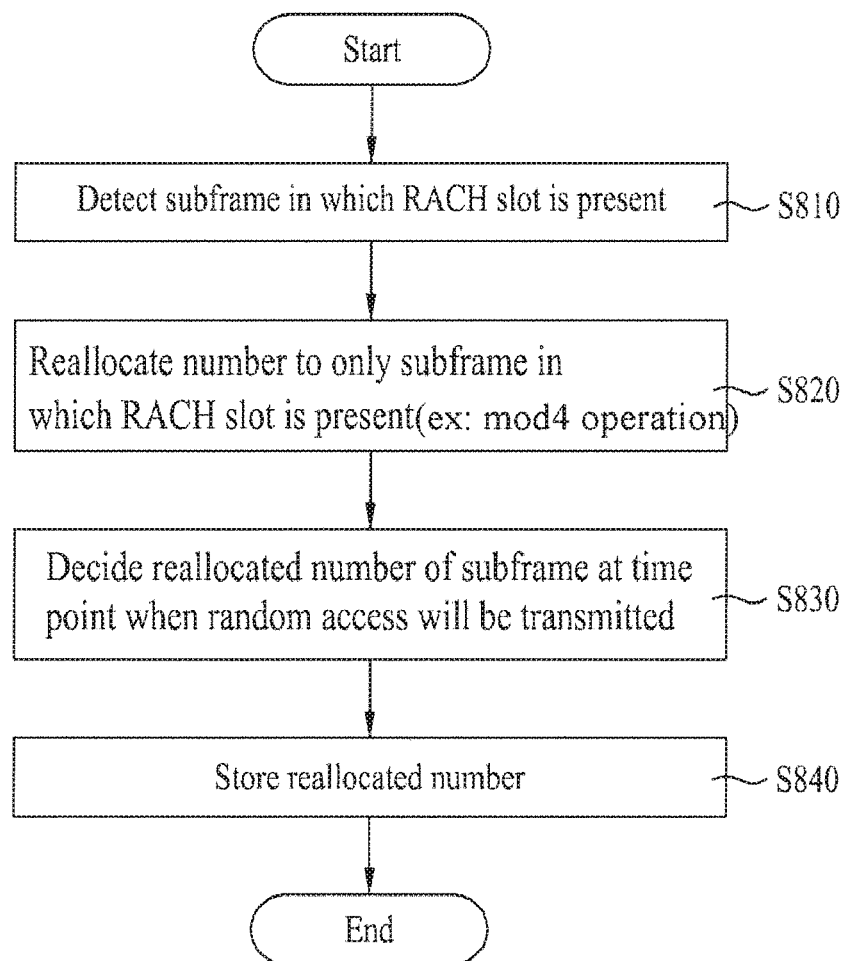
FIG. 8 is a flowchart in detail illustrating an internal process of a step S420 of FIG. 4 according to another embodiment of the present invention.

FIG. 8 is a flowchart in detail illustrating an internal process of a step S420 of FIG. 4, in which the embodiment of FIG. 7 is applied, to the embodiment of FIG. 4.

In a step S810, subframes in which an RACH slot is present are detected. In a step S820, numbers are reallocated, to only the uplink subframes in which the RACH slot is present. In a step S830, the reallocated number of an uplink subframe at a time point when a random access will be transmitted is decided. In a step S840, the decided reallocated number is stored. Although, in this embodiment, the RACH slots are present only in even-numbered frames, the RACH slots may be present in any numbered frames. That is, the reallocation of the numbers in the step S830 may use the grouping method. In more detail, the modulo operation may be used.

Figure 9:
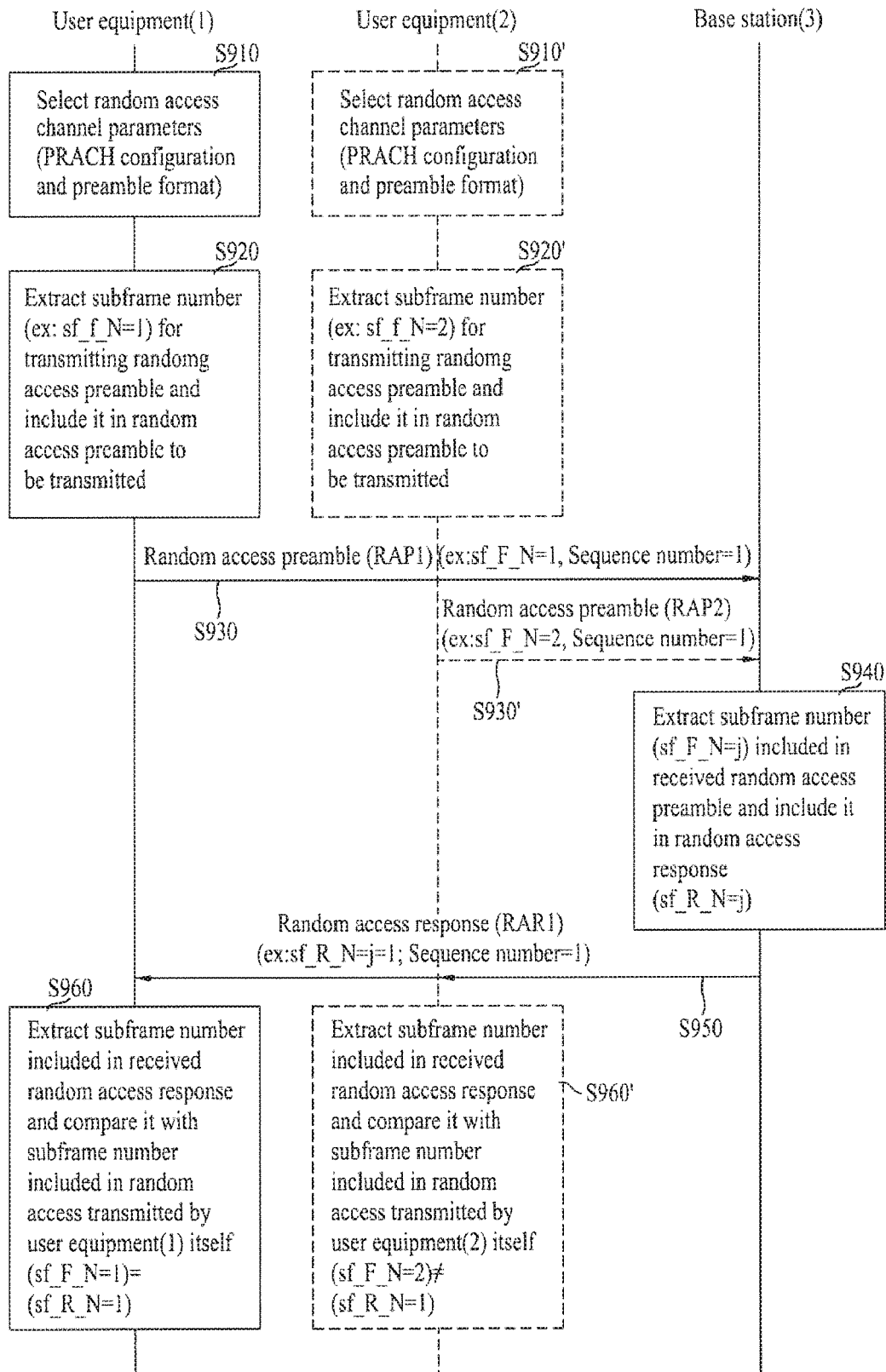
FIG. 9 is a flowchart illustrating a method of transmitting and receiving a random access request and a random access response according to another embodiment of the present invention.

FIG. 9 is a flowchart illustrating a method of transmitting and receiving a random access request and a random access response according to another embodiment of the present invention, that is, a method of transmitting and receiving a random access between a user equipment 1, a user equipment 2 and a base station.

The user equipment 1 and the user equipment 2 may select random access channel parameters such as a PRACH configuration and a preamble format in steps S910 and S910' respectively. As the PRACH configuration and the preamble format, one of the configurations shown in Table 1 and Table 2 may be selected. The user equipment 1 and the user equipment 2 decide the sequence numbers of the random access preambles to be transmitted and apply to the random access preambles, respectively. In this embodiment, the random access preamble sequence numbers transmitted by the user equipment 1 and the user equipment 2 may be identical or different. The user equipment 1 and the user equipment 2 extract the uplink subframe numbers at time points when the random access preambles are transmitted and include the extracted uplink subframe numbers in the random access preambles to be transmuted in steps S920 and S920', respectively. The time point when the random access preamble is transmitted by the user equipment 1 may be different from the time point when the random access preamble is transmitted by the user equipment 2. Hereinafter, the respective uplink subframe numbers included in the random access preambles transmitted by the user equipment 1 and the user equipment 2 are denoted by sf_F_N. In this embodiment, the random access preambles RAP1 and RAP2 transmitted by the user equipment 1 and the user equipment 2 are transmitted at time points corresponding to the uplink subframe numbers sf_F_N=1 and sf_F_N=2, respectively. The user equipment 1 and the user equipment 2 transmit the random access preambles in steps S930 and S930', respectively. In this embodiment, it is assumed that both the random access preambles transmitted by the user equipment 1 and the user equipment 2 have a sequence number 1.

If the base station 3 receives the random access preambles e.g., RAP1 and RAP2), the base station 3 may extract the sequence numbers and the uplink subframe number sf_F_N==j included in the received random access preambles and include the extracted information in the random access responses of the received random access preambles (S940). Hereinafter, the uplink subframe number included in the random access response is denoted by sf_R_N. Thereafter, the base station 3 transmits the random access response RAR1 (S950). The transmitted random access response RAR1 may reach the user equipment 1 and the user equipment 2. In this embodiment, the base station 3 may transmit the random access response RAR1 of the random access preamble transmitted by the user equipment 1 before transmitting the random access response RAR2 of the random access preamble transmitted by the user equipment 2. The user equipment 1 and the user equipment 2 receive the respective random access responses RAR1 transmitted in the step S950. The user equipment 1 and the user equipment 2 extract the uplink subframe number included in the received random access responses RAR1 and compare the extracted uplink subframe number with the uplink subframe numbers included in the respective random accesses transmitted by the user equipments, in the steps S960 and S960'. In the user equipment 1, since the uplink subframe number sf_R_N=1 included in the received random access response RAR1 is identical to the uplink subframe number sf_F_N=1 of the random access preamble RAP1 transmitted by the user equipment 1, it may be determined that the received random access response RAR1 is the response of the random access preamble RAP1 transmitted by the user equipment 1. In the user equipment 2, since the uplink subframe number sf_R_N=1 included in the received random access response RAR1 is different from the uplink subframe number sf_F_N=2 of the random access preamble RAP2 transmitted by the user equipment 2, it may be determined that the received random access response RAR1 is nor the response of the random access preamble RAP2 transmitted by the user equipment 2. Each user equipment may further use sequence information included in the received random access response as well as the uplink subframe number included in the received random access response, in order to check whether the random access response received by each user equipment is the response of the random access preamble transmitted by each user equipment. If both the sequence information and the uplink subframe number included in the random access response received by any user equipment are identical to the sequence information and the uplink subframe number included in the random access preamble transmitted by the user equipment, it may be determined that the received random access response is the response of the random access preamble transmitted by the use equipment.

Figure 10:
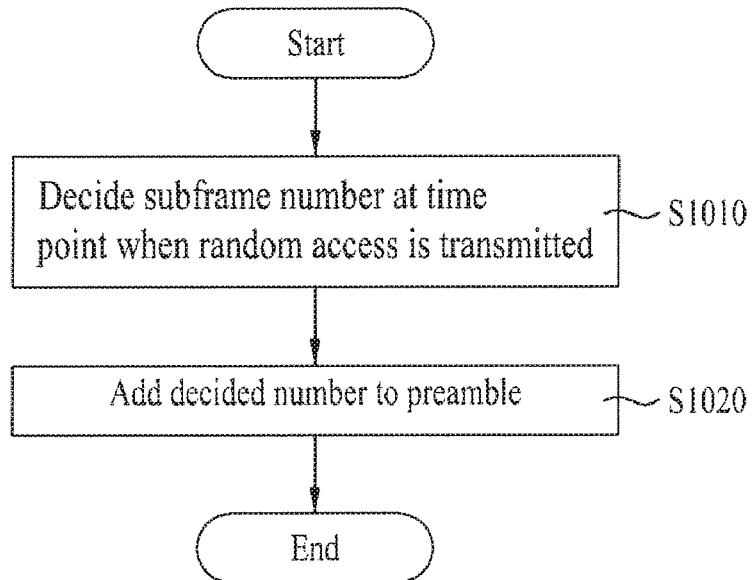
FIG. 10 is a view in detail showing an internal process of a step S920 (S920') of FIG. 9.

FIG. 10 is a view in detail showing an internal process of the step S920 (S920') of FIG. 9.

Figure 11:
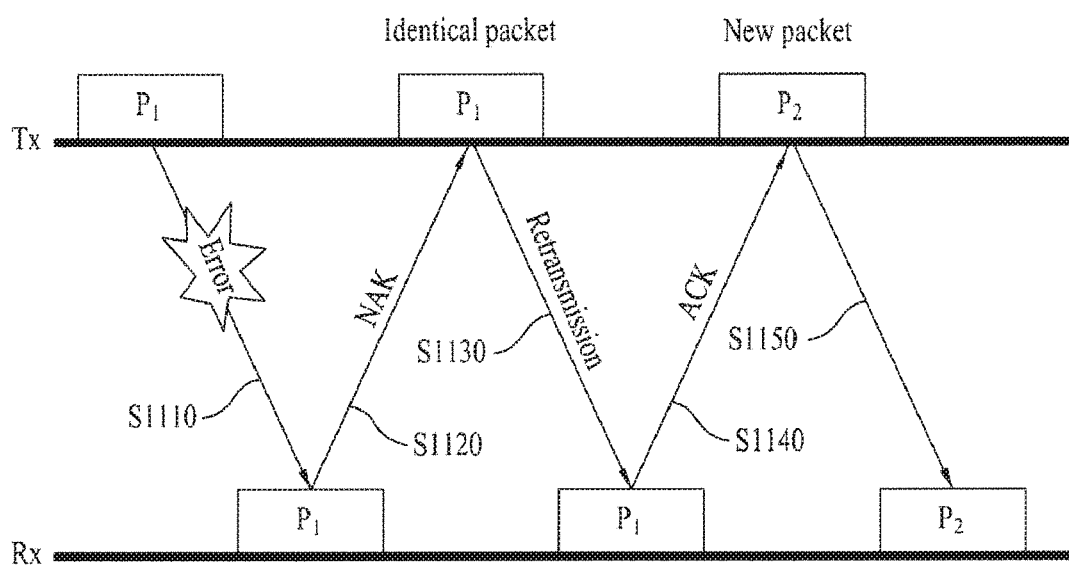
FIG. 11 is a view explaining the principle of an automatic repeat request (ARQ).
Figure 12:
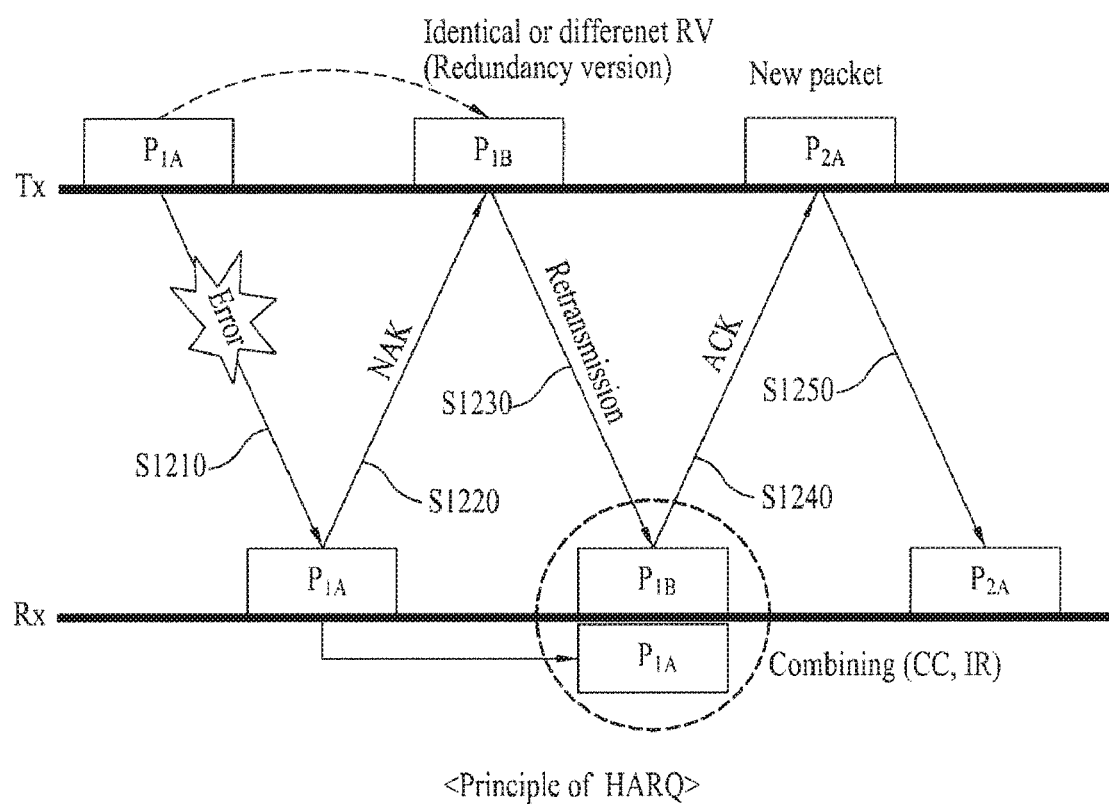
FIG. 12 is a view explaining the principle of a hybrid automatic repeat request (HARQ).
Figure 13:
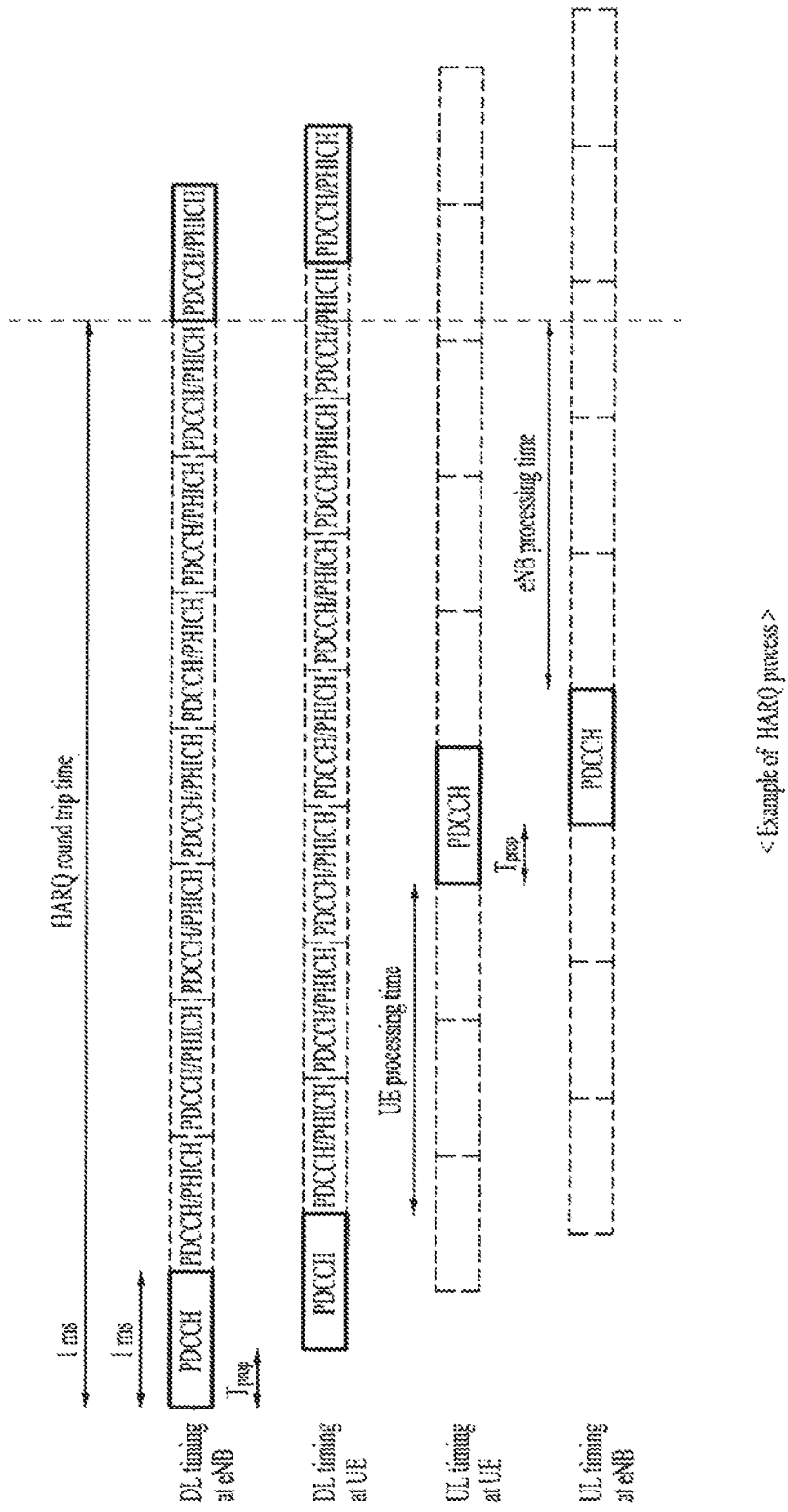
FIG. 13 is a view showing a detailed, example of a HARQ process according to another embodiment of the present invention.

The user equipments 1 and 2 decide the uplink subframe numbers at the time point when the random access preambles are transmitted. Thereafter, the user equipments 1 and 2 add the uplink subframes numbers decided in the step S1010 to the preambles to be transmitted, in a step S1020. FIGS. 11, 12 and 13 are views facilitating the understanding of the other embodiments of the present invention, which show the principle of an ARQ, the principle of a HARQ and a detailed example of a HARQ process, respectively.

In the other embodiments of the present invention, a user equipment waits for a response at a predetermined time period. The user equipment which transmits a random access preamble can previously know a time point when a response of the random access preamble transmitted by the user equipment is transmitted, on the basis of the predetermined time period.

For example, the predetermined time period may be decided in association with HARQ timing. The HARQ is a hybrid technology of an ARQ technology of an MAC layer and a channel coding technology of a physical layer. The ARQ is a closed-loop error correction method based on feedback. If an error occurs in the physical layer in spite of mating an effort to suppress the occurrence of the error in a transmission by forward error correction (FEC), a packet in which the error occurs is retransmitted by the ARQ in an RLC layer. As a result, when data is transmitted to the RLC layer in uplink, information may be restored by only packets without an error.

FIG. 11 is a view explaining the principle of the ARQ. If an error occurs when a packet $P.sub.1$ transmitted by a transmitter Tx is received by a receiver Rx (S1110), the receiver Rx transmits a negative acknowledgement (NAK) signal (S1120). The transmitter Tx which receives the NAK signal retransmits the same packet $P.sub.1$ as the packet $P.sub.1$ in which the error occurs upon transmission (S1130). If the receiver Rx confirms that an error does not occur in the retransmitted packet, the receiver Rx transmits an ACK signal to the transmitter Tx (S1140). The transmitter Tx which receives the ACK signal transmits a new packet $P.sub.2$ (S1150).

FIG. 12 is a view explaining the principle of the HARQ. The HARQ is different from the ARQ in that the channel coding of the physical layer is combined to the ARQ. If an error occurs when a receiver Rx receives a packet $P.sub.1A$ transmitted by a transmitter Tx (S1210), the receiver Rx transmits an NAK signal (S1220). The transmitter Tx which receives the NAK signal transmits a packet $P.sub.1B$ (51230). In FIG. 12, the packet $P.sub.1A$ and the packet $P.sub.1B$ are made of the same information bits, that is, the same channel encoder input packet $P.sub.1A$ and are identical or slightly different. In the HARQ, although an error occurs in the packet $P.sub.1A$ which is first transmitted, since the packet $P.sub.1A$ has any information amount, the packet $P.sub.1A$ is stored without being discarded until the retransmitted signal is received and is soft-combined with the retransmitted signal $P.sub.1B$ or is demodulated using another method. A method of utilizing packets in which errors occur and newly retransmitted packets includes a chase combining (CC) method and an incremental redundancy (IR) method.

Each user equipment can estimate a random access response location on the basis of HARQ timing at a time location of the RACH slot transmitted by the user equipment and receive only a downlink signal in a specific time location section. For example, like FIG. 13 showing the example of the HARQ process, if it is assumed that a time consumed for performing the HARQ process is 1 ms and the number of HARQ processes is 8, a time consumed for, at the user equipment, processing a signal transmitted from a base station in downlink and, at the base station, processing the signal transmitted by the user equipment in uplink is 8 ms in FIG. 13, T.sub.prop denotes a propagation delay time. A half of a. H ARQ round trip time or a half of the total number of HARQ processes is consumed for receiving a response of a transmitted signal excluding the processing time of the received signal.

The user equipment which attempts random access may wait for a half of the HARQ round trip time or a half of the total number of HARQ processes from a time point when a random access preamble is transmitted, and wait for a response within a predetermined time period from a time point when a half of the HARQ round trip time or a half of the total number of HARQ processes elapses. Alternatively, a method of applying an offset (delay offset) in consideration of a difference between a data processing time and a random access processing time may be used. For example, a method of receiving a downlink signal by the user equipment at a location separated from a time determined by the HARQ round trip time or the total number of HARQ processes by one subframe. This offset may be represented by adding or subtracting a predetermined number and may be represented by a multiple of the number of HARQ processes.

If the RACH having a length of 2 ms or 3 ms is transmitted in the above method, a method of estimating a time for waiting for a response from a time location for a start time location of an RACH slot is possible. Alternatively, a method of estimating a time for waiting for a response from a time location for an end time location of art RACH slot is possible.

It is possible to prevent each user equipment to erroneously receive a response for another user equipment as its response using a predetermined response reception time location. If this method is used, signaling overhead is no longer included in random data in which overhead is transmitted and received.

Figure 14:
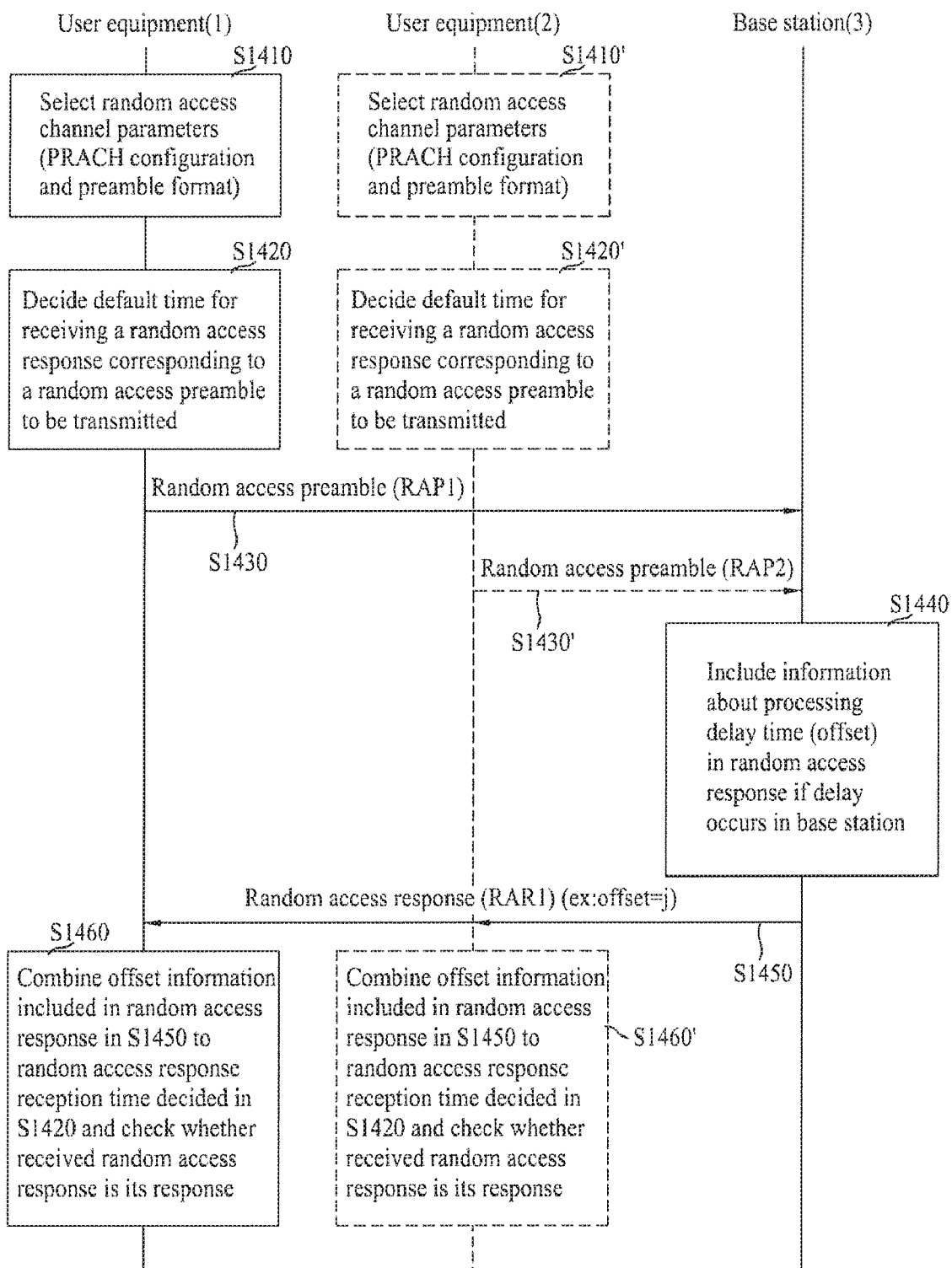
FIG. 14 is a flowchart illustrating a method of transmitting and receiving a random access request and a random access response according to another embodiment of the present invention.

FIG. 14 is a flowchart illustrating a method of transmitting and receiving a random access between a user equipment 1, a user equipment 2 and a base station, according to an embodiment of the present invention.

The user equipment 1 and the user equipment 2 select random access channel parameters, such as a PRACH configuration and a preamble format, in steps S1410 and S1410', respectively. As the PRACH configuration and the preamble format, one of the configurations shown in Table 1 and Table 2 may be selected. The user equipment 1 and the user equipment 2 may decide the sequence numbers of the random access preambles to be transmitted and apply it to the random access preambles, respectively. In this embodiment, the random access preamble sequence numbers transmitted by the user equipment 1 and the user equipment 2 may be identical or different. The user equipment 1 and the user equipment 2 decide default times, in which the random access responses of the random access preambles to be transmitted will be received, and default uplink subframe sections in advance. The default times or the default uplink subframe sections may be changed when processing delay occurs in the base station. This change may be, although described below, performed by, at the base station, transmitting a random access response in a state of including information about a processing delay time when processing delay occurs in the base station. The time point when the random access preamble is transmitted by the user equipment 1 may be different from the time point when the random access preamble is transmitted by the user equipment 2. In this embodiment, the random access preambles RAP1 and RAP2 transmitted by the user equipment 1 and the user equipment 2 are transmitted at time points corresponding to the uplink subframe numbers sf_F_N=1 and sf_F_N=2, respectively. The user equipment 1 and the user equipment 2 transmit the random access preambles in steps S1430 and S1430', respectively.

If the base station 3 receives the random access preambles (e.g., RAP1 and RAP2), the base station 3 transmits a random access response RAR1 of the received random access preambles. At this time, as described above in association with FIG. 7, if the base station uses all resources for other processes and thus cannot allocate the resources with respect to the random access request, processing delay may occur when the random access response is transmitted. If such processing delay occurs, the base station 3 may include information about the processing delay time (timing offset) in the random access response (S1440). Thereafter, the base station transmits a random access response RAR1 (S1450). The transmitted random access response may reach both the user equipment 1 and the user equipment 2. In this embodiment, the base station 3 transmits the random access response RAR1 of the random access preamble transmitted by the user equipment 1 before transmitting the random access response RAR2 of the random access preamble transmitted by the user equipment 2. The user equipment 1 and the user equipment 2 receive the respective random access responses transmitted in the steps S1460 and S1460'. The user equipment 1 and the user equipment 2 check whether the received random access responses are received at the default times set in the steps S1460 and S1460', respectively. Hereinafter, the step S1460 of the user equipment 1 will be described.

It is assumed that the received random access response is received at the default time set by the user equipment 1. At this time, the received random access response may be or may not be the response of the random access preamble transmitted by the user equipment 1. If the offset included in the received random access response is 0 (zero), it is indicated that the processing delay does not occur in the base station 3. Accordingly, it may be determined that the random access response received at the default time set by the user equipment 1 is the response of the random access preamble transmitted by the user equipment 1. In contrast, if the offset included in the received random access response is not 0 (zero), it is indicated that the processing delay occurs in the base station. Accordingly, it may be determined that the random access response received at the default time set by the user equipment 1 is not the response of the random access preamble transmitted by the user equipment 1.

Subsequently, the step S1460 of the user equipment 1 will be described. It is assumed that the received random access response is not received at the default time set by the user equipment 1. At this time, the received random access response may be or may not be the response of the random access preamble transmitted by the user equipment 1. If the offset included in the received random access response is 0 (zero), it is indicated that the processing delay does not occur in the base station 3. Accordingly, the user equipment 1 should receive the random access response at the default time set by the user equipment 1. Thus, it may be determined that the received random access response is not the response of the random access preamble transmitted by the user equipment 1. In contrast, if the offset included in the received random access response is not 0 (zero), it is indicated that the processing delay occurs in the base station. Accordingly, it may be determined that the random access response received at the default time set by the user equipment 1 is the response of the random access preamble transmitted by the user equipment 1. It is assumed that the user equipment 1 receives the random access response after j sections (or the number of subframes or the time) from a time decided in the step S1420. At this time, the offset included in the received random access response corresponds to the j sections, it is determined that the received random access response is the response of the random access preamble transmitted by the user equipment 1. In contrast, if the offset included in the received random access response does not correspond to the j sections, it is determined that the received random access response is not the response of the random access preamble transmitted by the user equipment 1.

The above-described embodiments are proposed by combining constituent components and characteristics of the present invention according to a predetermined format. The individual constituent components or characteristics should be considered to be optional, factors on the condition that there is no additional remark. If required, the individual constituent components or characteristics may not be combined with other components or characteristics. Also, some constituent component and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It will be apparent to those skilled in the art that unrelated claims are combined so as to configure embodiments or are included in new claims by amendments after an application.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with a user equipment (UE), a mobile station (MS) or a mobile subscriber station (MSS) as necessary.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (EPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wireless mobile communication apparatuses.

The invention claimed is:

1. A method for performing a random access by a user equipment (UE), the method comprising:
   receiving a random access response from a base station within a time period;
   extracting information associated with a subframe number of a subframe in which a random access preamble was transmitted by the user equipment, and
   determining that the received random access response is a response to the transmitted random access preamble based on the information,
   wherein the time period starts at a time point after an end time of transmitting the random access preamble, the time point is obtained by adding an offset to a subframe number corresponding to the end time of transmitting the random access preamble and the offset equals three.

2. A user equipment (UE) to perform a random access, the UE comprising:
   a receiver to receive a random access response from a base station within a time period; and
   a processor configured to extract information associated with a subframe number of a subframe in which a random access preamble was transmitted by the user equipment,
   wherein the processor is configured to determine that the received random access response is a response to the transmitted random access preamble based on the information, and
   wherein the time period starts at a time point after an end time of transmitting the random access preamble, the time point is obtained by adding an offset to a subframe number corresponding to the end time of transmitting the random access preamble and the offset equals three.

3. The method of claim 1, wherein the random access preamble is transmitted to the base station in the subframe.

4. The method of claim 1, wherein the offset is determined based on a processing time of a hybrid automatic repeat request (HARQ) process and a processing time of the random access.

5. The method of claim 1, wherein the offset is determined by subtracting one subframe from a half of a round trip time of a hybrid automatic repeat request (HARQ) process, the round trip time of the HARQ process corresponding to eight subframes.

6. The UE of claim 2, wherein the random access preamble is transmitted to the base station in the subframe.

7. The UE of claim 2, wherein the offset is determined based on a processing time of a hybrid automatic repeat request (HARQ) process and a processing time of the random access.

8. The UE of claim 2, wherein the offset is determined by subtracting one subframe from a half of a round trip time of a hybrid automatic repeat request (HARQ) process, the round trip time of the HARQ process corresponding to eight subframes.

9. A method for performing a random access by a base station, the method comprising:
   generating a random access response in response to a random access preamble, the random access response comprising information associated with a subframe number of a subframe; and
   transmitting the random access response to a User Equipment (UE) within a time period,
   wherein the time period starts at a time point after an end time in which transmitting the random access preamble was terminated by the UE, and a subframe number corresponding to the time point is obtained by adding an offset to a subframe number corresponding to the end time, and the offset equals three.

10. The method of claim 9, wherein the random access preamble is received by the base station in the subframe.

11. The method of claim 9, wherein the offset is determined based on a processing time of a hybrid automatic repeat request (HARQ) process and a processing time of the random access.

12. The method of claim 9, wherein the offset is determined by subtracting one subframe from a half of a round trip time of a hybrid automatic repeat request (HARQ) process, the round trip time of the HARQ process corresponding to eight subframes.

13. A base station to perform a random access, the base station comprising:
   a processor configured to generate a random access response in response to a random access preamble, the random access response comprising information associated with a subframe number of a subframe; and
   transmitter to transmit the random access response to a User Equipment (UE) within a time period,
   wherein the time period starts at a time point after an end time in which transmitting the random access preamble was terminated by the UE, and a subframe number corresponding to the time point is obtained by adding an offset to a subframe number corresponding to the end time, and the offset equals three.

14. The base station of claim 13, wherein the random access preamble is received by the base station in the subframe.

15. The base station of claim 13, wherein the offset is determined based on a processing time of a hybrid automatic repeat request (HARQ) process and a processing time of the random access.

16. The base station of claim 13, wherein the offset is determined by subtracting one subframe from a half of a round trip time of a hybrid automatic repeat request (HARQ) process, the round trip time of the HARQ process corresponding to eight subframes.

* * * * *